US008984352B2

(12) United States Patent
Katsuragi

(10) Patent No.: US 8,984,352 B2
(45) Date of Patent: Mar. 17, 2015

(54) STORAGE CONTROL APPARATUS AND CONTROL METHOD OF STORAGE CONTROL APPARATUS

(75) Inventor: Eiju Katsuragi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/866,915

(22) PCT Filed: Apr. 14, 2010

(86) PCT No.: PCT/JP2010/002687
§ 371 (c)(1),
(2), (4) Date: Aug. 10, 2010

(87) PCT Pub. No.: WO2011/128936
PCT Pub. Date: Oct. 20, 2011

(65) Prior Publication Data

US 2013/0024734 A1 Jan. 24, 2013

(51) Int. Cl.
*G06F 11/00* (2006.01)
*G06F 3/06* (2006.01)
*G06F 11/07* (2006.01)

(52) U.S. Cl.
CPC ............ *G06F 3/0659* (2013.01); *G06F 3/0611* (2013.01); *G06F 3/0617* (2013.01); *G06F 3/0689* (2013.01); *G06F 11/0727* (2013.01); *G06F 11/0757* (2013.01)
USPC ............................................ 714/55; 714/6.22

(58) Field of Classification Search
CPC ............ G06F 11/0727; G06F 11/0757; G06F 11/0793; G06F 11/1076
See application file for complete search history.

(56) References Cited

U.S. PATENT DOCUMENTS

| | | | | |
|---|---|---|---|---|
| 5,758,057 | A * | 5/1998 | Baba et al. | 714/6.32 |
| 2002/0069377 | A1 | 6/2002 | Mabuchi et al. | |
| 2003/0212858 | A1* | 11/2003 | Apperley et al. | 711/114 |
| 2004/0205381 | A1 | 10/2004 | Sakai | |
| 2005/0240742 | A1* | 10/2005 | Eng et al. | 711/167 |
| 2005/0240743 | A1* | 10/2005 | Eng et al. | 711/167 |
| 2006/0026347 | A1* | 2/2006 | Hung | 711/114 |
| 2007/0220313 | A1 | 9/2007 | Katsuragi et al. | |
| 2009/0106491 | A1* | 4/2009 | Piszczek et al. | 711/114 |
| 2009/0240992 | A1 | 9/2009 | Ishii et al. | |
| 2011/0154134 | A1* | 6/2011 | Kohada | 714/54 |

FOREIGN PATENT DOCUMENTS

| | | |
|---|---|---|
| JP | 9-258907 A | 10/1997 |
| JP | 11-259242 A | 9/1999 |

(Continued)

OTHER PUBLICATIONS

JP Office Action in JP App. No. 2012-510449. dated May 21, 2013.

*Primary Examiner* — Scott Baderman
*Assistant Examiner* — Jason Bryan
(74) *Attorney, Agent, or Firm* — Mattingly & Malur, P.C.

(57) ABSTRACT

[This invention] inhibits the response time of the storage control apparatus from being longer even if the response time of the storage apparatus is long.
The disk adapter (DKA), receiving a read message from the channel adapter (CHA), sets the timeout time in accordance with specified conditions, and tries to read data from the storage apparatus 4. As the timeout time, either the normal value or the shortened value is selected. If a timeout error occurs, the read job is reset, and correction read is started.

11 Claims, 26 Drawing Sheets

(56) References Cited

FOREIGN PATENT DOCUMENTS

| | | | |
|---|---|---|---|
| JP | 2004-252692 A | 9/2004 | |
| JP | 2007-213721 A | 8/2007 | |
| JP | 2007-233903 A | 9/2007 | |
| JP | 2005-182658 A | 7/2008 | |

* cited by examiner

Device ID-VDEV correspondence relationship management table

C11 C12 C13 C14

| Logical device ID | VDEV# | Starting SLOT # | SLOT amount |
|---|---|---|---|
| 001 | 001 | 0 | 1000 |
| 002 | | 1000 | 1000 |
| 003 | | 2000 | 1000 |
| 004 | 002 | 0 | 1000 |
| 005 | | 1000 | 1000 |
| 006 | | 2000 | 1000 |
| 007 | 003 | 0 | 1000 |
| 008 | | 1000 | 1000 |
| 009 | | 2000 | 1000 |
| ... | ... | ... | ... |

VDEV management table

| VDEV# (C21) | Slot size (C22) | RAID level (C23) | Data drive amount (C24) | Parity cycle slot amount (C25) | Disk type (C26) | Queuing mode (C27) | Response time guarantee mode (C28) |
|---|---|---|---|---|---|---|---|
| 101 | 512 | 1 | 1 | 8 | FC | 0 | 1 |
| 102 | 116 | 5 | 3 | 8 | SATA | 1 | 0 |
| 103 | 96 | 6 | 6 | 8 | SAS | 0 | 1 |
| ... | ... | ... | ... | ... | ... | ... | ... |

Mode setting table

C31 C32

| Item | Setting value |
|---|---|
| Queuing mode | 0 |
| Response time guarantee mode | 0 |

JCB (JOB Control Block)

| C41 JCB# | C42 JOB status | C43 WAIT expiration time | C44 Starting flag | C45 Failure occurrence flag | C46 Inheritance information |
|---|---|---|---|---|---|
| 0000 | RUN | 1000 | 0 | 0 | aaaa |
| 0001 | WAIT | 2000 | 0 | 0 | bbbb |
| 0002 | Unused | 3000 | 0 | 0 | — |
| ... | ... | ... | ... | ... | ... |

Error count management table

C51, C52, C53, C520, C521, C522, C530, C531, C532

| HDD# | HDD failure | | | Timeout failure | | |
|---|---|---|---|---|---|---|
| | Error count | TH1a (Copy to spare) | TH2a (Correction copy) | Error count | TH1b (Copy to spare) | TH2b (Correction copy) |
| 0000 | 1 | 10 | 20 | 1 | 20 | 40 |
| 0001 | 0 | 10 | 20 | 1 | 20 | 40 |
| ... | ... | ... | ... | ... | ... | ... |

| Method for setting TOV shorter than normal value | |
|---|---|
| # (C61) | Contents (C62) |
| 1 | Comply with response time guarantee mode set for each VDEV. |
| 2 | Comply with response time guarantee mode set for entire storage control apparatus. |
| 3 | Cases where low-speed drive (SATA). |
| 4 | Cases where queuing mode is set to FIFO. |
| 5 | Cases where HDD operation status (number of queuing commands) is under specified value. |

TOV setting threshold table

C71 C72 C73 C74

| HDD# | Queuing command amount | TH3 (FIFO) | TH4 (Sorting) |
|---|---|---|---|
| 0000 | 0 | 20 | 5 |
| 0001 | 10 | 20 | 5 |
| 0002 | 20 | 20 | 5 |
| ... | ... | ... | ... |

Staging processing status management table

C81 C82 C83

| # | Contents | Value |
|---|---|---|
| 1 | Set TOV to shortened value and [issue] read request | 0 |
| 2 | TOV occurs in read target HDD | 0 |
| 3 | Error occurs in correction read | 0 |
| 4 | Second data read from read target HDD | 0 |

Response time management table

C91 C92 C93 C94

| VDEV# | HDD# | Response time | Determination |
|---|---|---|---|
| 0001 | 100 | t1 | Normal |
| | 101 | t2 | Normal |
| | 102 | t3 | Normal |
| | 103 | t4 | Normal |
| 0002 | 104 | t5 | Late |
| | 105 | t6 | Late |
| | 106 | t7 | Late |
| | 107 | t8 | Late |
| ... | | | |

STORAGE CONTROL APPARATUS AND CONTROL METHOD OF STORAGE CONTROL APPARATUS

TECHNICAL FIELD

This invention relates to a storage control apparatus and the control method of the storage control apparatus.

BACKGROUND ART

Corporate users and others manage data by using storage control apparatuses. A storage control apparatus groups physical storage areas which multiple storage apparatuses comprise respectively as redundant storage areas based on RAID (Redundant Array of Independent (or Inexpensive) Disks). The storage control apparatus creates logical volumes by using grouped storage areas, and provides the same to a host computer (hereinafter referred to as the host).

The storage control apparatus, receiving a read request from the host, instructs a hard disk to read the data. The address of the data read from the hard disk is converted, stored in a cache memory, and transmitted to the host.

The hard disk, if unable to read data from storage media due to the occurrence of a certain type of problem in the storage media, a magnetic head or others, retries [read] after a period of time. If unable to read the data from the storage media in spite of performing the retry processing, the storage control apparatus performs correction copy, and generates the data required by the host. Correction copy is the method for restoring the data by reading the data and the parity from the other hard disks belonging to the same parity group as the hard disk in which the failure occurred (Patent Literature 1).

CITATION LIST

Patent Literature

PTL 1: Japanese Unexamined Patent Application Publication No. 2007-213721

SUMMARY OF INVENTION

Technical Problem

If the retry processing is performed in the hard disk, the time before the read request issued by the host is performed becomes longer. Therefore, the response performance of the storage control apparatus is deteriorated, and the quality of the services provided by the application programs on the host is deteriorated.

If an application program operating on the host does not care the response time, no particular problem occurs. However, for example, such as a ticketing program, a reservation program, and a video distribution program, in case of the application programs which must process a large number of accesses from the client machines in a short time, if the response time of the storage control apparatus becomes longer, the service quality is reduced.

Therefore, the purpose of this invention is to provide a storage control apparatus and the control method of the storage control apparatus which, even if the response time of the storage control apparatus is long, can inhibit the response time from the storage control apparatus to the higher-level device from being longer. The further purposes of this invention are disclosed by the description of the embodiments described later.

Solution to Problem

For solving the above-mentioned problem, the storage control apparatus complying with the Aspect 1 of this invention is a storage control apparatus which inputs/outputs data in accordance with a request from a higher-level device and comprises multiple storage apparatuses for storing data and a controller connected to the higher-level device and each storage apparatus and which makes a specified storage apparatus of the respective storage apparatuses input/output the data in accordance with the request from the higher-level device, wherein the controller, if receiving an access request from the higher-level device, sets the timeout time to a second value which is shorter than a first value in a certain case, requires the read of specified data corresponding to the access request to the specified storage apparatus of the respective storage apparatuses and, if the data cannot be acquired from the specified storage apparatus within the set timeout time, detects that a timeout error occurred and, if the timeout error is detected, makes a second management unit which is different from a first management unit for managing failures which occur in the respective storage apparatuses manage the occurrence of the timeout error and, furthermore, requires the read of other data corresponding to the specified data to another storage apparatus related to the specified storage apparatus, generates the specified data in accordance with the other data acquired from another storage apparatus, and transfers the generated specified data to the higher-level device.

At the Aspect 2, the controller at the Aspect 1 comprises a first communication control unit for communicating with the higher-level device, a second communication control unit for communicating with the respective storage apparatuses, and a memory used by the first communication control unit and the second communication control unit, wherein the memory stores timeout time setting information for determining whether to set the timeout time to the first value or to the second value, wherein the timeout time setting information includes the number of queues whose targets are the respective storage apparatuses, a threshold for First In First Out in cases where the First In First Out mode is set as the queuing mode, and a threshold for sorting which is smaller than the threshold for First In First Out in cases where the queuing mode is set to the sorting mode in which sorting is performed in ascending order of distance of logical addresses, wherein, if the first communication control unit receives an access request from the higher-level device, the second communication control unit, in accordance with the timeout time setting information, if the number of queues whose target is the specified storage apparatus is equal to or larger than either the threshold for First In First Out or the threshold for sorting corresponding to the queuing mode set for the specified storage apparatus, selects the first value as the timeout time for reading the specified data from the specified storage apparatus and, if the number of queues whose target is the specified storage apparatus is under either the threshold for First In First Out or the threshold for sorting corresponding to the queuing mode set for the specified storage apparatus, selects the second value which is smaller than the first value as the timeout time for reading the specified data from the specified storage apparatus, wherein the second communication control unit requires the read of the specified data to the specified storage apparatus, wherein the second communication control unit, if unable to acquire the specified data from the specified storage apparatus within the set timeout time, detects the occurrence of a timeout error, wherein the second communication control unit, if the timeout error is detected, makes a second management unit which is different from a first management unit for managing failures which occur in the respective storage apparatuses manage the occurrence of the timeout error, wherein the value of a threshold for restoration for starting a specified restoration step related to the storage apparatus in which the failure occurred is set larger for the second control unit than the first control unit, wherein the second communication control unit sets another timeout time for which the first value is selected, requires the read of other data corresponding to the specified data to the other storage apparatuses related to the specified storage apparatus, generates the specified data in accordance with the other data acquired from the other storage apparatuses, and transfers the generated specified data to the higher-level device, and wherein the second communication control unit, if unable to acquire the other data from the other storage apparatuses within another timeout time and if the second value is set as the timeout time, changes the timeout time to the first value, and requires the read of the specified data to the specified storage apparatus again.

At the Aspect 3, the management unit at the Aspect 1 manages the number of failures which occurred in the respective storage apparatuses and a threshold for restoration for starting a specified restoration step related to the storage apparatuses in which the failures occurred by making the same correspond to each other, the second management unit manages the number of timeout errors which occurred in the respective storage apparatuses and another threshold for restoration for starting the specified restoration step related to the storage apparatuses in which the timeout errors occurred by making the same correspond to each other, and the other threshold for restoration managed by the second management unit is set larger than the threshold for restoration managed by the first management unit.

At the Aspect 4, the controller at the Aspect 1, if the guarantee mode for guaranteeing the response within the specified time is set in the specified storage apparatus, the timeout time for reading the specified data from the specified storage apparatus is set to the second value.

At the Aspect 5, the controller, if the queuing mode related to the specified storage apparatus is set to the First In First Out mode, the timeout time for reading the specified data from the specified storage apparatus is set to the second value.

At the Aspect 6, the controller at the Aspect 1, if the specified storage apparatus is a storage apparatus other than the previously specified low-speed storage apparatus, the timeout time for reading the specified data from the specified storage apparatus is set to the second value.

At the Aspect 7, the controller at the Aspect 1, if the number of queues whose target is the specified storage apparatus is smaller than the specified threshold, the timeout time for reading the specified data from the specified storage apparatus is set to the second value.

At the Aspect 8, the controller at the Aspect 1 comprises timeout time setting information for determining whether to set the timeout time to the first value or to the second value, which includes the number of queues whose targets are the respective storage apparatuses, the threshold for First In First Out in cases where the First In First Out mode is set as the queuing mode, and the threshold for sorting which is smaller than the threshold for First In First Out in cases where the queuing mode is set to the sorting mode in which sorting is performed in ascending order of distance of logical addresses, and further, the controller, if the number of queues whose target is the specified storage apparatus is equal to or larger than either the threshold for First In First Out or the threshold for sorting corresponding to the queuing mode set for the specified storage apparatus, selects the first value as the timeout time for reading the specified data from the specified storage apparatus and, if the number of queues whose target is the specified storage apparatus is under either the threshold for First In First Out or the threshold for sorting corresponding to the queuing mode set for the specified storage apparatus, selects the second value which is smaller than the first value as the timeout time for reading the specified data from the specified storage apparatus.

At the Aspect 9, the controller at the Aspect 1, if a timeout error is detected, sets another timeout time for which the first value is selected, requires the read of other data corresponding to the specified data to the other storage apparatuses related to the specified storage apparatus.

At the Aspect 10, the controller at the Aspect 1, if a timeout error is detected, sets another timeout time for which the second value is selected, requires the read of other data corresponding to the specified data to the other storage apparatuses related to the specified storage apparatus.

At the Aspect 11, the controller at the Aspect 10, if unable to acquire the other data from the other storage apparatuses within another timeout time, changes the timeout time to the first value, and requires the read of the specified data to the specified storage apparatus again.

At the Aspect 12, the controller at the Aspect 10, if unable to acquire the other data from the other storage apparatuses within another timeout time, notifies the user.

This invention can also be comprehended as a control method of a storage control apparatus. Furthermore, at least a part of the configuration of this invention can be configured as a computer program. This computer program can be distributed fixed in storage media or via a communication network. Furthermore, other combinations than the combinations of the above-mentioned aspects are also included in the scope of this invention.

BRIEF DESCRIPTION OF DRAWINGS

FIG. 6 is a table for managing the relationship between the storage apparatuses and virtual devices (RAID groups).

FIG. 7 is a table for managing virtual devices.

FIG. 8 is a table for managing the modes which can be set from the management terminal.

FIG. 9 is a table for managing jobs.

FIG. 14 shows a table for managing the error count.

FIG. 15 is an explanatory diagram showing the method for setting the timeout time shorter than the normal value.

FIG. 16 is a table for managing the thresholds for setting the timeout time with regard to the Embodiment 2.

FIG. 18 is a table for managing the status of the staging processing with regard to the Embodiment 4.

FIG. 23 is a table for managing the response time of the respective storage apparatuses.

DESCRIPTION OF EMBODIMENTS

Figure 1:
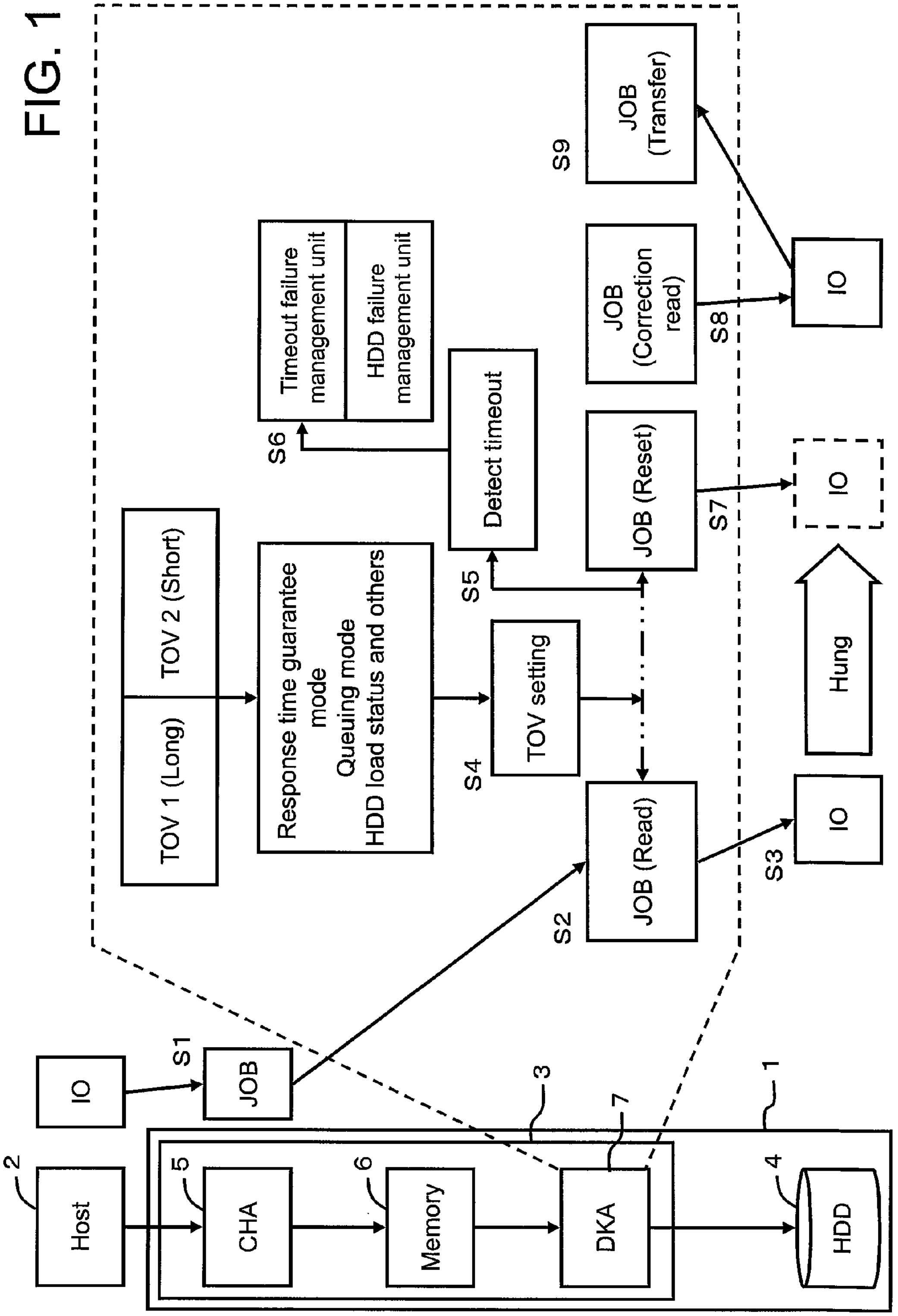
FIG. 1 is an explanatory diagram showing the overall concept of the embodiment of this invention.

Hereinafter, with reference to the figures, the embodiments of this invention are described. Firstly, the overview of this invention is described with reference to FIG. 1, and then the embodiments are described with reference to FIG. 2 and the subsequent figures. FIG. 1 is stated to the extent required for the understanding and practice of this invention. The scope of this invention is not limited to the configuration stated in FIG. 1. The characteristics which are not stated in FIG. 1 are disclosed in the embodiments described later.

FIG. 1 shows the overview of the overall [invention]. The configuration of the computer system is stated on the left side of FIG. 1 and the overview of the processing is stated on the right respectively. The computer system comprises a storage control apparatus 1 and a host 2 as a higher-level device. The storage control apparatus 1 comprises a controller 3 and a storage apparatus 4. The controller 3 comprises a channel adapter 5 as the first communication control unit, a memory 6, and a disk adapter 7 as the second communication control unit. In the description below, the channel adapter is abbreviated to the CHA, and the disk adapter is abbreviated to the DKA. The range surrounded by a dashed line in FIG. 1 indicates the contents of the processing by the DKA 7.

As the storage apparatus 4, various types of devices capable of reading and writing data are available, for example, a hard disk device, a semiconductor memory device, an optical disk device, a magnetic-optical disk device, a magnetic tape device, a flexible disk device, and others.

If a hard disk device is to be used as a storage apparatus, for example, an FC (Fibre Channel) disk, an SCSI (Small Computer System Interface) disk, an SATA disk, an ATA (AT Attachment) disk, an SAS (Serial Attached SCSI) disk, and others can be used. If a semiconductor memory device is to be used as a storage apparatus, various types of memory devices are available, for example, a flash memory, an FeRAM (Ferroelectric Random Access Memory), an MRAM (Magnetoresistive Random Access Memory), a phase-change memory (Ovonic Unified Memory), an RRAM (Resistance RAM), a PRAM (Phase change RAM), and others.

An application program operating on the host 2 issues an access request (referred to as an "IO" in the figure) to the storage control apparatus 1. The access request is either a read request or a write request. The read request require's data read from the storage apparatus 4. The write request requires data write to the storage apparatus 4. If the storage control apparatus 1 processes the write request, the existing data is frequently read at first. That is, for processing the write request, data read is performed in the storage control apparatus 1.

The CHA 5, receiving an access request (e.g. a read request) from the host 2, generates a job for acquiring the required data (S1).

The DKA 7, detecting the job created by the CHA 5, issues a read request to the specified storage apparatus 4 storing the data required by the host 2 (S2). The storage apparatus 4, accepting the read request, tries to read the data from the storage media (S3).

The DKA 7 sets the upper limit time (timeout time) required for acquiring the data from the storage apparatus 4 (S4). Hereinafter, the timeout time is occasionally abbreviated to a TOV (Time Out Value).

Multiple TOVs are prepared in advance, which are a TOV 1 as the first value and a TOV 2 as a second value. The TOV 1 is a normally set value. The TOV 2 is a value which is set if the response performance is prioritized, and the value is set shorter than the TOV 1. Therefore, it is possible to also refer to the TOV 1 as a normal value and the TOV 2 as a shortened value.

In one example, the TOV 1 is set to approximately 4 to 6 seconds. The TOV 2 is set to around 1 second, for example, approximately 0.9 second. The TOV 2 is set to ensure that the total value of the time required for the correction read processing and the TOV 2 falls within a specified time, for example, approximately 2 seconds.

The DKA 7, in accordance with the previously set condition, sets the timeout time to either the TOV 1 or the TOV 2. Though the details are described later, for example, if the mode which guarantees the response time of the storage control apparatus 1 is set, the TOV 2 is selected. If the queuing mode (queue processing method) related to the storage apparatus 3 as the read target is set to the first-in first-out (FIFO: First In First Out) mode, the TOV 2 is selected. If the storage apparatus 4 as the read target is other than a low-speed storage apparatus, the TOV 2 is selected. Furthermore, with reference to the operating status (load status) of the storage apparatus 4 as the read target, either the TOV 1 or the TOV 2 can be selected.

If there is a response from the storage apparatus 4 within the set timeout time, the data read from the storage apparatus 4 is transmitted via the CHA 5 to the host 2. Meanwhile, if a certain type of error occurs inside the storage apparatus 4 and if the response cannot be transmitted within the timeout time, the DKA 7 determines the occurrence of a timeout error (S5).

The DKA 7 makes the management unit for managing timeout errors (the second management unit) store the occurrence of the timeout error (timeout failure). An ordinary failure reported from the storage apparatus 4 is stored in the management unit for managing ordinary failures in the storage apparatus (the first management unit).

The DKA 7, detecting the timeout error, resets the read request issued at S3 (S7). The DKA 7 starts the correction read processing (S8). The correction read processing is the processing of reading other data (and a parity) belonging to the same stripe string as the first read target data from the other respective storage apparatuses 4 belonging to the same parity group as the storage apparatus 4 in which the timeout error is detected, and of generating the first read target data by a logical operation. The correction read processing is also referred to as the correction copy processing.

The DKA 7 transfers the restored data to the cache memory (S9). Though not shown in the figure, the CHA 5 transmits the data transferred to the cache memory to the host 2. By this step, the processing of the read request (read command) received from the host 2 is completed.

In this embodiment which is configured as described above, the DKA 7, if satisfying a specified condition, sets a short timeout time TOV 2 for the read request transmitted to the storage apparatus 4 and, if a timeout error occurs, resets the read request and performs the correction read processing.

Therefore, even if the response performance of the storage apparatus 4 as the read target is deteriorated due to high-load or other reasons, the correction read processing is performed after the TOV 2 elapses, and therefore the response performance of the storage control apparatus 1 can be prevented from deterioration. The response time of the storage control apparatus 1 becomes the value ascertained by adding the time required for the correction read processing to the TOV 2, and it is possible to transmit the data to the host 2 within the specified response time.

In this embodiment, for example, if the response time guarantee mode is set, if the queuing mode is FIFO, if [the specified storage apparatus is] not a low-speed storage apparatus, or if the storage apparatus is not highly loaded, the timeout time for reading data from the storage apparatus 4 is set to the TOV 2 which is a shorter value than usual. Therefore, in this embodiment, in accordance with the circumstances, the response performance of the storage control apparatus 1 can be prevented from deterioration.

In this embodiment, timeout errors are managed in a management unit which is different from the management unit for managing ordinary failures in the storage apparatus. Therefore, in this embodiment, the start of the restoration step related to the storage apparatus 4 in which the failure occurred (e.g. the processing of copying the data in the storage apparatus 4 to a spare storage apparatus or the processing of restoring the data in the storage apparatus 4 by the correction copy processing) can be controlled separately for timeout errors and for ordinary failures.

That is, in this embodiment, for preventing the response performance of the storage control apparatus 1 from deterioration, under the specified condition, the timeout time for reading the data from the storage apparatus 4 is set to the TOV 2 which is shorter than the conventional value TOV 1. Therefore, depending on the status of the storage apparatus 4, it is possible that a relatively large number of timeout errors might occur. If timeout errors and ordinary failures are collectively managed, the possibility of the total number of the failure counts exceeding the threshold becomes higher, and the number of times of performing the restoration step increases. if the restoration step is performed frequently, the load on the storage control apparatus 1 increases, and the response performance of the storage control apparatus 1 might be negatively affected. Therefore, in this embodiment, timeout errors and ordinary failures in the storage apparatus are managed separately.

Embodiment 1

Figure 2:
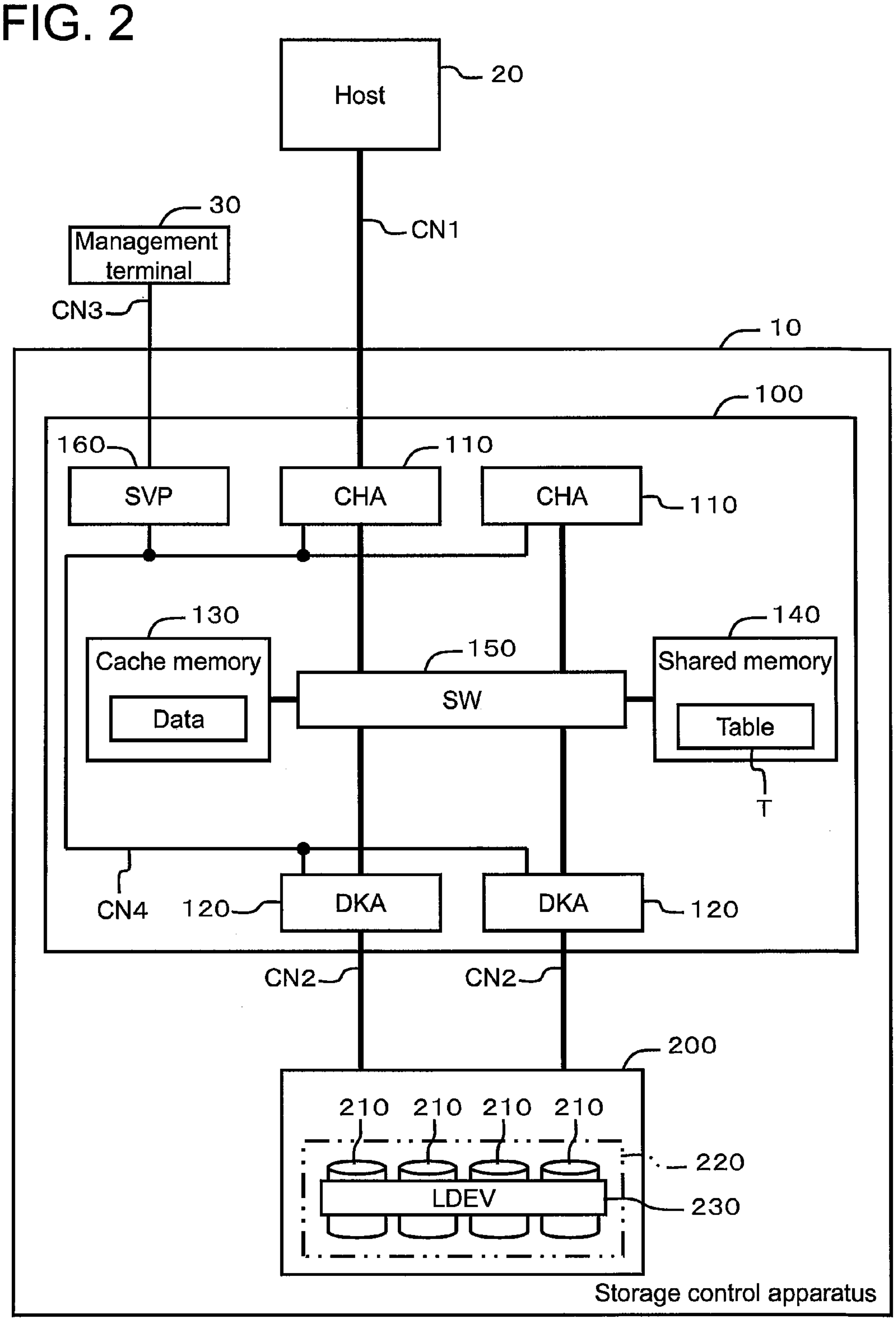
FIG. 2 is an explanatory diagram showing the overall configuration of the system including the storage control apparatus.

FIG. 2 shows the overall configuration of the system including the storage control apparatus 10 with regard to this embodiment. This system can be configured, for example, by including at least one storage control apparatus 10, one or more hosts 20, and at least one management terminal 30.

The correspondence relationship to the embodiment described above in FIG. 1 is described. The storage control apparatus 10 corresponds to the storage control apparatus 1 in FIG. 1, the storage apparatus 210 corresponds to the storage apparatus 4 in FIG. 1, the host 20 corresponds to the host 2 in FIG. 1, the controller 100 corresponds to the controller 3 in FIG. 1, the channel adapter 110 corresponds to the CHA 5 in FIG. 1, the disk adapter 120 corresponds to the DKA 7 in FIG. 1, and the cache memory 130 and the shared memory 140 correspond to the memory 6 in FIG. 1 respectively.

The host 20 and the management terminal 30 are described at first, and then the storage control apparatus 10 is described. The host 20, for example, is configured as a mainframe computer or a server computer. The host 20 is connected to the storage control apparatus 10 via a communication network CN1. The communication network CN1 can be configured as a communication network, for example, such as an FC-SAN (Fibre Channel-Storage Area Network) or an IP-SAN (Internet Protocol_SAN).

The management terminal 30 is connected to a service processor 160 in the storage control apparatus 10 via a communication network CN3. The service processor 160 is connected to the CHA 110 and others via an internal network CN4. The communication networks CN3 and CN4 are configured, for example, as a communication network such as LAN (Local Area Network). The management terminal 30, via the service processor (hereinafter referred to as the SVP) 160, collects various types of information in the storage control apparatus 10. Furthermore, the management terminal 30, via the SVP 160, can instruct various types of setting in the storage control apparatus 10.

The configuration of the storage control apparatus 10 is described below. The storage control apparatus 10 can be roughly classified into the controller 100 and the storage apparatus installed unit 200. The controller 100 is configured, for example, by comprising at least one or more CHAs 110, at least one or more DKAs 120, at least one or more cache memories 130, at least one or more shared memories 140, a connection unit ("SW" in the figure) 150, and the SVP 160. Note that the configuration in which multiple controllers 100 are connected to each other via switches may also be permitted. For example, a cluster can be configured of multiple controllers 100.

The CHA 110 is for controlling data communication with the host 20 and is configured, for example, as a computer apparatus comprising a microprocessor, a local memory, and others. Each CHA 110 comprises at least one or more communication ports.

The DKA 120 is for controlling data communication with the respective storage apparatuses 210 and is configured, as the CHA 110, as a computer apparatus comprising a microprocessor, a local memory, and others.

The respective DKAs 120 and the respective storage apparatuses 210 are connected, for example, via a communication path CN2 complying with the fibre channel protocol. The respective DKAs120 and the respective storage apparatuses 210 perform data transfer in units of blocks.

The path through which the controller 100 accesses the respective storage apparatuses 210 is made redundant. Even if a failure occurs in one of DKAs 120 or one of the communication paths CN2, the controller 100 can access the storage apparatus 210 by using the other DKA 120 or the other communication path CN2. Similarly, the path between the host 20 and the controller 100 can also be made redundant. The configuration of the CHA 110 and the DKA 120 is described later in FIG. 3.

The operation of the CHA 110 and the DKA 120 is briefly described. The CHA 110, receiving a read command issued by the host 20, stores this read command in the shared memory 140. The DKA 120 refers to the shared memory 140 as needed and, if discovering an unprocessed read command, reads the data from the storage apparatus 210 and stores the same in the cache memory 130. The CHA 110 reads the data transferred to the cache memory 130, and transmits the same to the host 20. The processing in which the DKA 120 transfers the data read from the storage apparatus 210 to the cache memory 130 is referred to as the staging processing. The details of the staging processing are described later.

Meanwhile, the CHA 110, receiving a write command issued by the host 20, stores the write command in the shared memory 140. Furthermore, the CHA 110 stores the received write data in the cache memory 130. The CHA 110, after storing the write data in the cache memory 130, reports the write completion to the host 20. The DKA 120, complying with the write command stored in the shared memory 140, reads the data stored in the cache memory 130, and stores the same in the specified storage apparatus 210.

The cache memory 130, for example, for storing user data and others received from the host 20. The cache memory 130 is configured of, for example, a volatile memory or a non-volatile memory. The shared memory 140 is configured of, for example, a non-volatile memory. In the shared memory 140, various types of tables T's described later, management information, and others are stored.

The shared memory 140 and the cache memory 130 can be set together on the same memory substrate. Otherwise, it is also possible to use a part of the memory as a cache area and use another part as a control area.

The connection unit 150 connects the respective CHAs 110, the respective DKAs 120, the cache memory 130, and the shared memory 140 respectively. By this method, all the CHAs 110 and the DKAs 120 can access the cache memory 130 and the shared memory 140 respectively. The connection unit 150 can be configured, for example, as a crossbar switch and others.

The SVP 160 is, via the internal network CN4, connected to the respective CHAs 110 and the respective DKAs 120 respectively. Meanwhile, the SVP 160 is connected to the management terminal 30 via the communication network CN3. The SVP 160 collects the respective statuses inside the storage control apparatus 10 and provides the same to the management terminal 30. Note that the SVP 160 may also be only connected to either the CHAs 110 or the DKAs 120. This is because the SVP 160 can collect the respective types of status information via the shared memory 140.

The configuration of the controller 100 is not limited to the above-mentioned configuration. For example, the configuration in which, on one or multiple control substrates, the function of performing data communication with the host 20, the function of performing data communication with the storage apparatuses 210, the function of temporarily storing the data, and the function of storing the respective tables as rewritable are respectively set may also be permitted.

The configuration of the storage apparatus installed unit 200 is described. The storage apparatus installed unit 200 comprises multiple storage apparatuses 210. The respective storage apparatuses 210 are configured, for example, as hard disk devices. Not limited to the hard disk devices, in some cases, flash memory devices, magnetic-optical storage apparatuses, holographic memory devices, and others can be used.

A parity group 220 is configured of a specified number of storage apparatuses 210, of which [the number] differs depending on the RAID configuration and others, for example, a pair or a group of four [storage apparatuses]. The parity group 220 is the virtualization of the physical storage areas which the respective storage apparatuses 210 in the parity group 220 comprise respectively.

Therefore, the parity group 220 is a virtualized physical storage area. This virtualized physical storage area is also referred to as a VDEV in this embodiment. In the virtualized physical storage area, one or multiple logical storage apparatuses (LDEVs) 230 can be set. The logical storage apparatuses 230 are made to correspond to LUNs (Logical Unit Numbers), and are provided to the host 20. The logical storage apparatuses 230 are also referred to as logical volumes.

Figure 3:
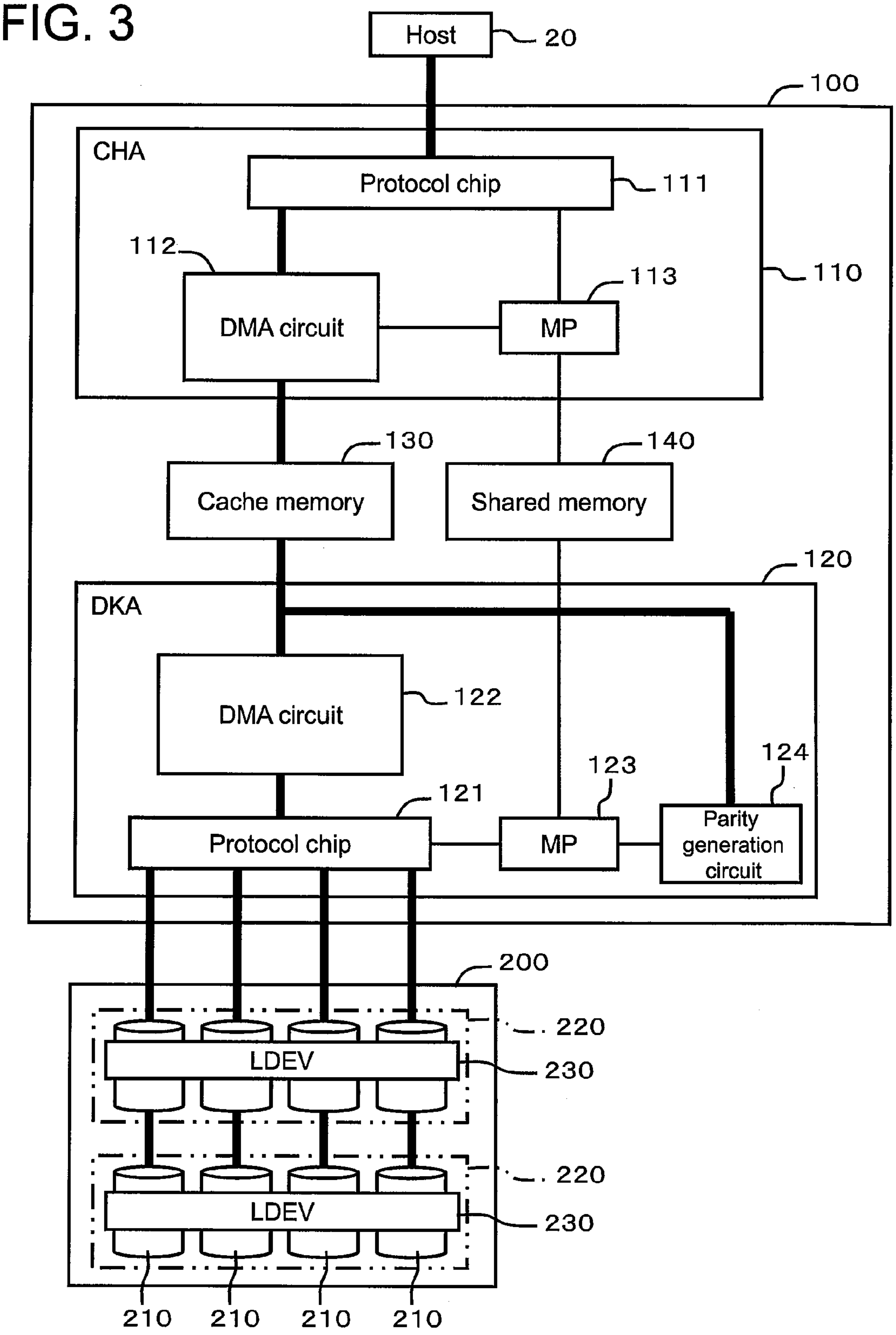
FIG. 3 is a block diagram of the storage control apparatus.

FIG. 3 is a block diagram showing the configuration of the CHA 110 and the DKA 120. The CHA 110, for example, comprises a protocol chip 111, a DMA circuit 112, and a microprocessor 113. The protocol chip 111 is a circuit for performing the communication with the host 20. The microprocessor 113 controls the overall operation of the CHA 110. The DMA circuit 122 is a circuit for performing the data transfer between the protocol chip 111 and the cache memory 130 in the DMA (Direct Memory Access) method.

The DKA 120, as the CHA 110, for example, comprises a protocol chip 121, a DMA circuit 112, and a microprocessor 123. Furthermore, the DKA 120 also comprises a parity generation circuit 124.

The protocol chip 121 is a circuit for communicating with the respective storage apparatuses 210. The microprocessor 123 controls the overall operation of the DKA 120. The parity generation circuit 124 is a circuit for generating parity data by performing a specified logical operation in accordance with the data stored in the cache memory 130. The DMA circuit 122 is a circuit for performing the data transfer between the storage apparatuses 210 and the cache memory 130 in the DMA method.

Figure 4:
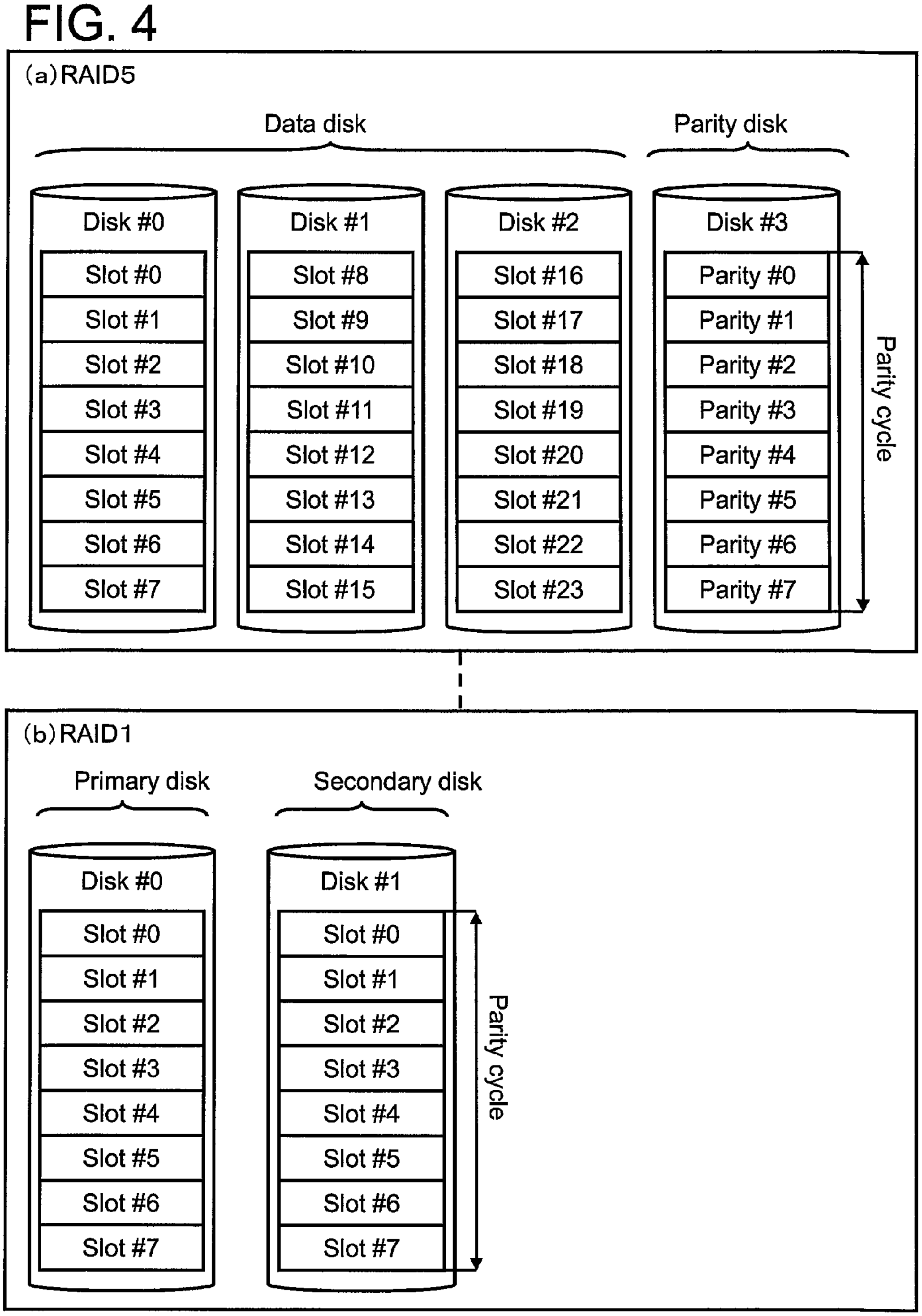
FIG. 4 is an explanatory diagram showing the mapping status of slots and storage apparatuses.

FIG. 4 is an explanatory diagram showing the frame format of the mapping status between the slots 300 and the storage apparatuses 210. FIG. 4(*a*) shows the case of the RAID5, and FIG. 4(*b*) shows the case of the RAID1.

FIG. 4(*a*) shows the case where the 3D+1PRAID5 is configured of three data disks (#0, #1, #2) and one parity disk (#3). Slots #0 to #7 are allocated in the data disk (#0), slots #8 to #15 are allocated in the data disk (#1), slots #16 to #23 are allocated in the data disk (#2), and parity #0 to #7 are allocated in the parity disk (#3) on the right side respectively. That is, in each data disk, eight serial slots are allocated respectively.

The size of a parity which is equal to eight slots (#0 to #7) is referred to as a parity cycle. In the parity cycle next to the parity cycle shown in the figure, the parity is stored in the disk (#2) to the left of the disk (#3). In the further next parity cycle, the parity is stored in the disk (#1). As described above, the disk storing the parity data shifts in each parity cycle. As shown by FIG. 4(*a*), the number of slots included in one parity cycle can be ascertained by multiplying the number of data disks by 8.

Figure 5:
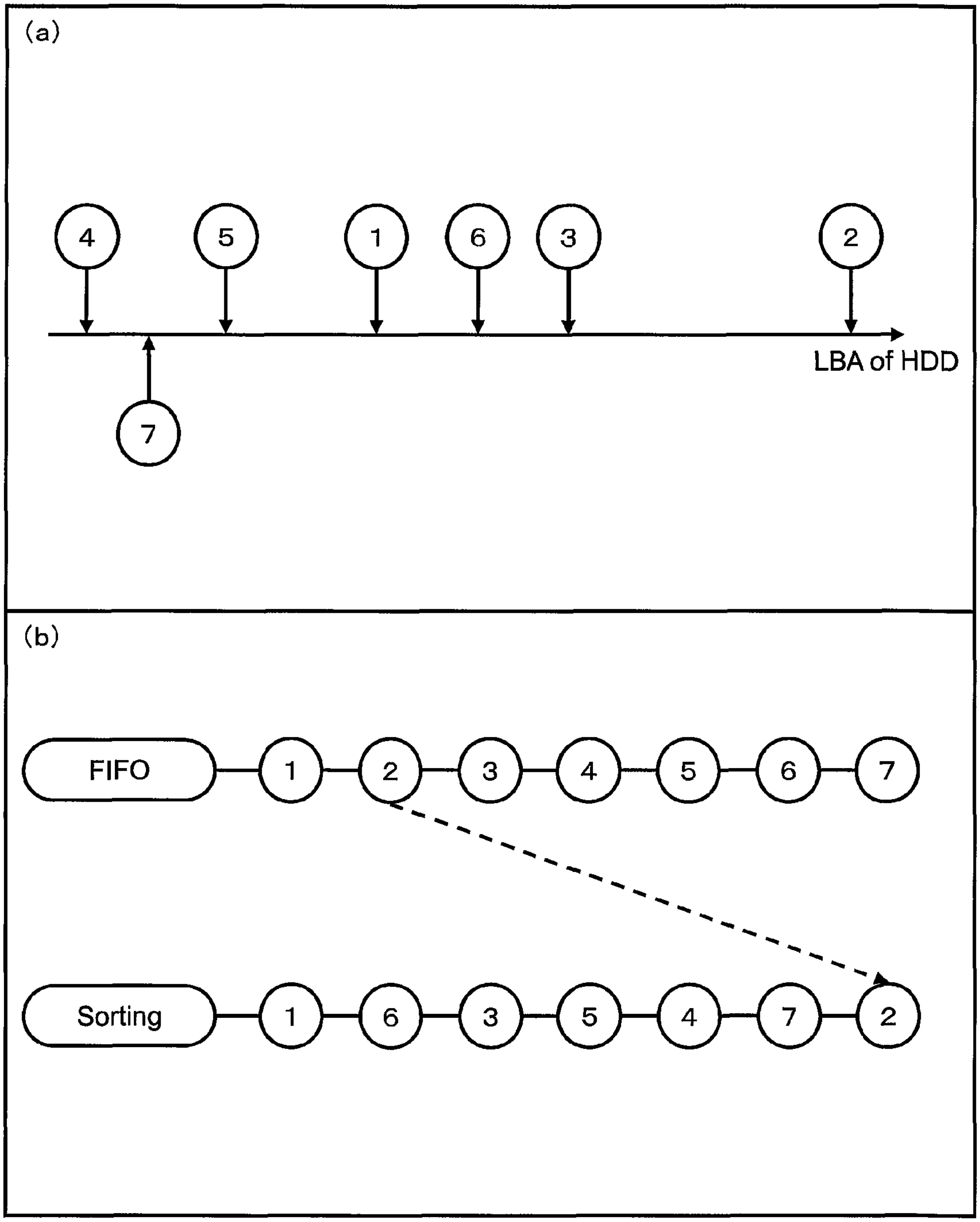
FIG. 5 is an explanatory diagram showing the differences between the queuing modes.

FIG. 5 shows the frame format of the queue processing method. In FIG. 5(*a*), seven queues from number 1 to 7 are shown. The horizontal axis in FIG. 5(*a*) shows the logical address on the storage area in the storage apparatus 210. The queue number shows the order of accepting commands. The distance between queues corresponds to the distance on the logical address.

FIG. 5(*b*) shows the queue processing method (mode). As the queuing modes, for example, the FIFO mode and the sorting mode are known. In the FIFO mode, the first received queue is processed first. Therefore, the queues are processed in order from the first queue to the seventh queue. Meanwhile, in the sorting mode, queues are sorted for reducing as much rotation latency and seek latency as possible. In the example shown in the figure, the processing is performed in order of the first queue, the sixth queue, the third queue, the fifth queue, the fourth queue, and the second queue. Though the second queue is generated early, the processing of the same is postponed. If the seventh queue is received before the processing of the fourth queue is completed, the seventh queue is processed immediately after the fourth queue, and the second queue is processed last.

If, as shown in FIG. 5, an identified small area is significantly accessed and a command which accesses a distant position is occasionally accepted, the processing of the one distant command is overtaken by the commands which are accepted later. It is possible that the one distant command might not be processed for a long time (e.g. approximately one second). As described above, in the sorting mode, though the average response time becomes faster than in the FIFO mode, the maximum value of the response time also becomes large.

FIG. 6 shows a table T10 for managing the correspondence relationship between the device IDs and VDEVs. This management table T10 is stored in the shared memory 140. The CHA 110 and the DKA 120 can use at least a part of the table T10 by copying the same in the local memories of the CHA 110 and the DKA 120.

The device ID-VDEV correspondence relationship management table T10 manages the correspondence relationship between the logical volumes 230 and VDEVs 220 as virtual intermediate storage apparatuses. The management table T10, for example, manages a device ID field C11, a VDEV number field C12, a starting slot field C13, and a slot amount field C14 by making the same correspond to each other.

In the device ID field C11, the information for identifying the logical volumes 230 is stored. In the VDEV number field C12, the information for identifying the VDEVs 220 is stored. In the starting slot field C13, the slot number indicating in which slot in the VDEV 220 the logical volume 230 starts is stored. In the slot amount field C14, the number of slots configuring the logical volume 230 is stored.

FIG. 7 shows a table T20 for managing VDEVs 220. This management table T20 is stored in the shared memory 140. The CHA 110 and the DKA 120 can use at least a part of the management table T20 by copying the same in the local memories.

The VDEV management table T20, for example, comprises a VDEV number field C21, a slot size field C22, a RAID level field C23, a data drive amount field C24, a parity cycle slot amount field C25, a disk type field C26, a queuing mode field C27, and a response time guarantee mode field C28 by making the same correspond to each other.

In the VDEV number field C21, the information for identifying the respective VDEVs 220 is stored. In the slot size field C22, the number of slots made to correspond to VDEVs is stored. In the RAID level field C23, the information such as RAID1 to RAID6 indicating the RAID type is stored. In the data drive amount field C24, the number of storage apparatuses 210 storing the data is stored.

In the parity cycle slot amount field C25, the number of slots included in a parity cycle is stored. The number of slots indicates, when allocating slots in the storage apparatuses 210, with how many slots the allocation should shift to the next storage apparatus 210. In the disk type field C26, the type of the storage apparatuses 210 configuring the VDEV 220 is stored.

In the queuing mode field C27, the type of the queuing mode applied to the VDEV 220 is stored. "0," in case of the FIFO mode, and "1," for the sorting mode, are set in the queuing mode field C27. In the response time guarantee mode field C28, the setting value of the response time guarantee mode is stored. The response time guarantee mode is the mode which guarantees that the response time of the VDEV 220 falls within a specified length of time. The case where "1" is stored indicates that the response time guarantee mode is set.

FIG. 8 shows the mode setting table T30. The mode setting table T30 is set by the management terminal 30 via the SVP 160. The mode setting table T30, for the entire storage control apparatus 10, sets the queuing mode and the response time guarantee mode. The mode setting table T30 comprises an item field C31 and a setting value field C32. In the item field C31, the queuing mode and the response time guarantee mode are stored. In the setting value field C32, the value indicating whether to set each mode or not is stored.

Note that either the mode setting table T30 or the queuing mode field C27 and the response time guarantee mode field C28 in the VDEV management table T20 must be set, and the storage control apparatus 10 may not have to comprise both of the tables T20 and T30.

That is, the queuing mode is either set in units of VDEVs (C27) or is set for the entire storage control apparatus 10 (T30). The response time guarantee mode is also either set in units of VDEVs (C28) or is set for the entire storage control apparatus 10 (T30).

Note that the configuration in which the VDEV management table T20 and the mode setting table T30 coexist may also be permitted. For example, it is possible to apply the setting values of the mode setting table T30 to all the VDEVs 220, and then ensure the configuration in which the queuing mode or the response time guarantee mode can be set for each VDEV 220 separately.

FIG. 9 shows a table T40 for managing jobs. The job management table T40 is also referred to as a job control block (JCB). The job management table T40 manages the status of jobs generated by the kernel.

The job management table T40, for example, manages a JCB number field C41, a job status field C42, a WAIT expiration time field C43, a starting flag field C44, a failure occurrence flag field C45, and a inheritance information field C46 by making the same correspond to each other.

In the JCB number field C41, the number for identifying the JCB for controlling each job is stored. In the job status field C42, the status of the job managed by the JCB is stored.

The job statuses are, for example, "RUN," "WAIT," and "Unused." "RUN" indicates that the job is running. If the DKA 120 receives a message from the CHA 110, the kernel of the DKA 120 generates a job, and assigns one unused JCB to the job. The DKA 120 changes the job status field C42 of the JCB assigned to the job from "Unused" to "RUN." "WAIT" indicates the status in which the completion of the job processing is being waited for. "Unused" indicates that the JCB is not assigned to any job.

In the WAIT expiration time field C43, the value created by adding the processing latency (timeout time) to the current time is stored. The current time is acquired from the system timer. For example, if the current time is "0000" and "1000" is set as the timeout time, the WAIT expiration time becomes 1000 (=0000+1000).

In the starting flag field C44, the value of the flag for determining whether to restart the job or not is stored. If the data input/output of the storage apparatus 210 is normally terminated or abnormally terminated, the starting flag is set to "1" by the interruption procession.

In the failure occurrence flag field C45, the value of the flag indicating whether a failure occurred in the storage apparatus 210 or not is stored. If a failure occurred in the storage apparatus 210, "1" is set in the failure occurrence flag field C45.

In the inheritance information field C46, the information required for restarting the job is stored. That type of information is, for example, the VDEV number, the slot number, and others.

The status of the job created by the reception of the read message, when the data read from the storage apparatus 210 is started, is changed from "RUN" to "WAIT." The kernel regularly monitors, among the jobs in the "WAIT" status, whether any job whose starting flag is set to "1" or whose WAIT expiration time elapses the current time exists or not.

If discovering a job whose starting flag is set to "1" or a job whose WAIT expiration time elapses, the kernel of the DKA 120 restarts the job. The status of the restarted job is changed from "WAIT" to "RUN." The restarted job continues the processing by referring to the inheritance information. When the job is completed, the status is changed from "RUN" to "Unused."

With reference to the flowcharts from FIG. 10 to FIG. 13, the operation of the storage control apparatus 10 is described. Each flowchart shows the overview of each processing, and might be different from the actual computer programs. What is called a person with an ordinary skill in the art may be able to alter or delete part of the steps shown in the figures or add new steps to the same.

Figure 10:
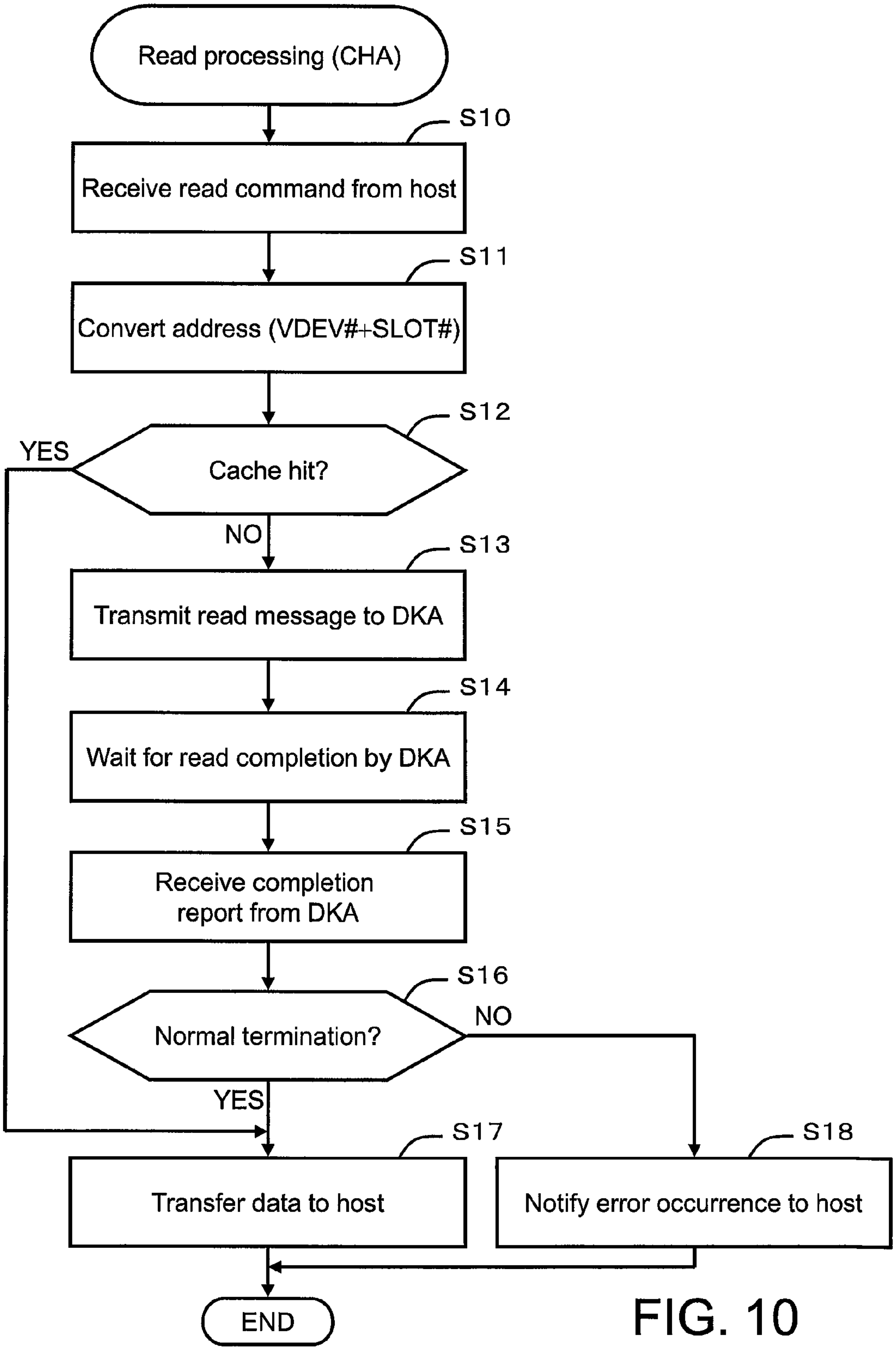
FIG. 10 is a flowchart showing the read processing.

FIG. 10 is a flowchart showing the read processing performed by the CHA 110. The CHA 110 realizes the functions shown in FIG. 10 by the microprocessor reading a specified computer program stored in the CHA 110 and performing the same.

The CHA 110, receiving a read command from the host 20 (S10), converts the logical address specified by the read command into a combination of a VDEV number and a slot number (S11).

The CHA 110 determines whether there is a cache hit or not (S12). If a cache area corresponding to the read target slot number is already secured and, at the same time, if the staging bit within the range of the read target logical block is set to on, a cache hit is determined.

If no cache hit is determined (S12: NO), the CHA 110 transmits a read message to the DKA 120 (S13). In the read message, a VDEV number, a slot number, a starting block number in the slot, and a number of target blocks are included.

The CHA 110, after transmitting the read message to the DKA 120, waits for the completion of the data read processing (staging processing) by the DKA 120 (S14). The CHA 110, receiving the completion report from the DKA 120 (S15), determines whether the data read from the storage apparatus is normally terminated or not (S16).

If the data read from the storage apparatus is normally terminated (S16: YES), the CHA 110 transmits the data stored in the cache memory 130 to the host 20 (S17), and completes this processing. If the data read from the storage apparatus fails (S16: NO), the CHA 110 notifies an error to the host 20 (S18), and completes this processing.

Figure 11:
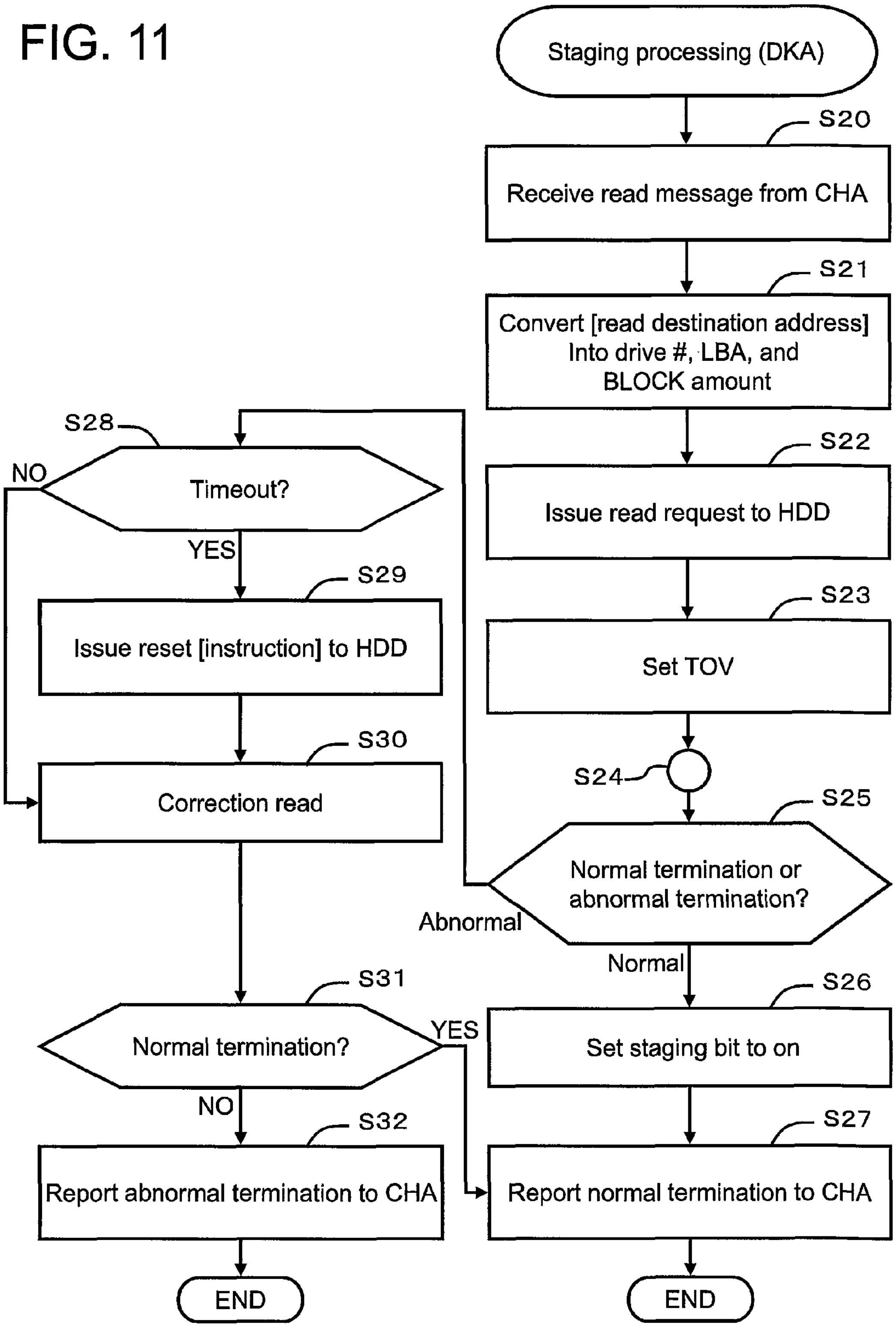
FIG. 11 is a flowchart showing the staging processing.

FIG. 11 is a flowchart of the staging processing. The staging processing is the processing of reading data from the storage apparatus and transferring the same to the cache memory, and is performed by the DKA 120.

The DKA 120, receiving the message from the CHA 110 (S20), secures an area for storing the data in the cache memory, and further converts the address specified by the message into a physical address (S21). That is, the DKA 120 converts the read destination address into a combination of a storage apparatus number, a logical address, and the number of logical blocks, and requires data read to the storage apparatus 210 (S22).

The DKA 120, for requiring data read to the storage apparatus 210, sets a timeout time (referred to as a TOV in the figure), and shifts to the waiting status (S23). The DKA 120 sets either the normal value TOV 1 which is relatively a long time or the shortened value TOV 2 which is relatively a short time as a timeout time. The selection method of the timeout time is described later in FIG. 15.

As described in FIG. 9, the job for reading the data from the storage apparatus 210 is changed to the "WAIT" status. If the starting flag is set to "1" or if the WAIT expiration time elapses, the job processing is restarted (S24).

The DKA 120 determines whether the data read is normally terminated or abnormally terminated (S25). The case where the data can be transferred from the storage apparatus 210 to the cache memory 130 is determined to be a normal termination. In case of the normal termination, the DKA 120 sets the staging bit to on (S26), and reports to the CHA 110 that the data read is normally terminated (S27).

Meanwhile, if the data read from the storage apparatus 210 is terminated abnormally, the DKA 120 determines whether a timeout error occurred or not (S28). The timeout error is an error in cases where the data cannot be read from the storage apparatus 210 within the set timeout time.

If a timeout error occurred (S28: YES), the DKA 120 issues a reset command to the storage apparatus 210 (S29). By the reset command, the data read request to the storage apparatus 210 is cancelled.

The DKA 120, after cancelling the data read request, performs the correction read processing (S30). The details of the correction read processing are described later in FIG. 12. If a failure other than the timeout error occurs in the storage apparatus 210 (S28: NO), the DKA 120 skips S29, and shifts to the S30.

Then, the DKA 120 determines whether the correction read processing is normally terminated or not (S31). If the correction read processing is normally terminated (S31: YES), the DKA 120 reports to the CHA 110 that the read request is normally terminated (S27). If the correction read processing is not terminated normally (S31: NO), the DKA 120 reports to the CHA 110 that the processing of the read request is terminated abnormally (S32).

Figure 12:
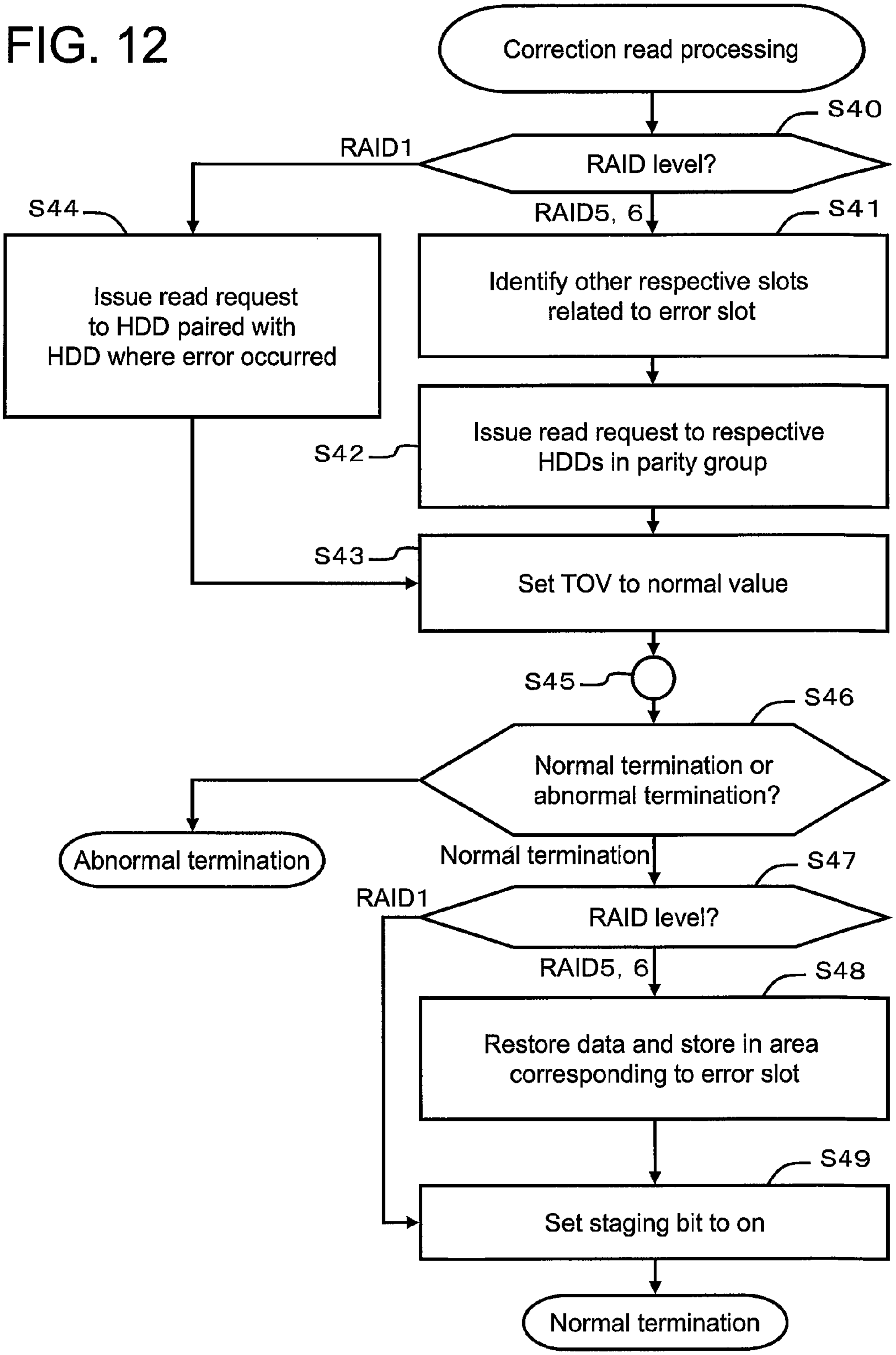
FIG. 12 is a flowchart showing the correction read processing.

FIG. 12 is a flowchart of the correction read processing shown as S30 in FIG. 11. The DKA 120 determines the RAID level of the VDEV 220 to which the read target storage apparatus 210 belongs (S40). In this embodiment, as an example, whether [the RAID level is] the RAID1, the RAID5, or the RAID6 is determined.

If the RAID level is either the RAID5 or the RAID6, the DKA 120 identifies the numbers of the other respective slots related to the error slot (S41). The error slot is the slot from which no data can be read and in which a certain type of failure occurred. The other respective slots related to the error slot are the other slots included in the same stripe string as the error slot.

The DKA 120, after securing an area for storing the data to be acquired from the other respective slots in the cache memory 130, issues a read request to the respective storage apparatuses 210 which comprise the other respective slots identified at S41 (S42). Furthermore, the DKA 120 sets the timeout time for reading the data from the respective storage apparatuses 210 as the normal value (S43). In this embodiment, for further ensuring the acquisition of the data required for restoring the data in the error slot, the timeout time is set as the normal value.

Meanwhile, if the RAID level is the RAID1, the DKA 120 issues a read request to a storage apparatus 210 which is paired with the storage apparatus 210 in which the error occurred (S44), and shifts to S43.

The job related to the read request is in the WAIT status. If the starting flag is set or the WAIT expiration time elapses, [the job] is restarted (S45). The DKA 120 determines whether the data read is normally terminated or not (S46). If [the data read is] not terminated normally, the DKA 120 terminates this processing abnormally.

If the data read is terminated normally, the DKA 120 determines the RAID level (S47). If [the RAID level] is either the RAID5 or the RAID6, the DKA 120, in accordance with the data and the parity read from the respective storage apparatuses 210, restores the data, and stores the restored data in the cache area corresponding to the error slot (S48). The DKA 120 sets the staging bit related to the slot to on (S49). In case of the RAID1, the DKA 120 skips S48, and shifts to the S49.

Figure 13:
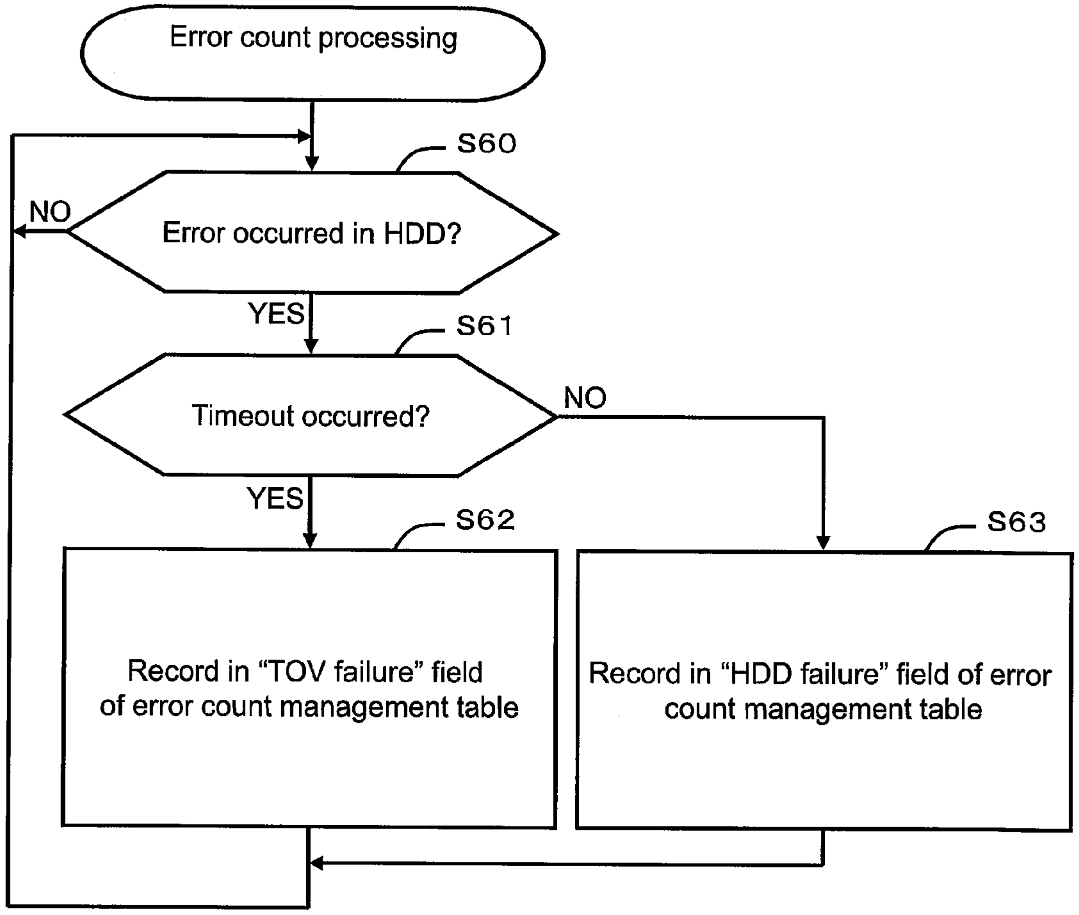
FIG. 13 is a flowchart showing the error count processing.

FIG. 13 is a flowchart of the error count processing. This processing is performed by the DKA 120. The DKA 120 monitors whether an error (failure) occurred in the storage apparatus 210 or not (S60). If an error occurred (S60: YES), the DKA 120 determines whether [the error is] a timeout error or not (S61).

If the error which occurred in the storage apparatus 210 is a timeout error (S61: YES), the DKA 120 records the timeout error to an timeout failure field C53 in the error count management table T50 shown in FIG. 14 (S62).

If the error which occurred in the storage apparatus 210 is a storage apparatus error other than a timeout error (S61: NO), the DKA 120 records the error to an HDD failure field C52 in the error count management table T50 (S63).

The error count management table T50 is described with reference to FIG. 14. The error count management table T50 manages the number of errors which occurred in the storage apparatus 210 and the threshold for performing the restoration step. The error management table T50 is stored in the shared memory 140, and the DKA 120 can use a part of the same by copying the same in the local memory.

The error count management table T50, for example, manages an HDD number field C51, the HDD failure field C52, and the timeout failure field C53 by making the same correspond to each other. The HDD number field C51 stores the information for identifying each storage apparatus 210.

The HDD failure field C52 manages ordinary failures which occur in the storage apparatus 210. The HDD failure field C52 comprises an error count field C520, a threshold field C521 for starting the copy to the spare storage apparatus, and a threshold field C522 for starting the correction copy.

The error count field C520 stores the number of times of ordinary failures which occurred in the storage apparatus. The threshold field C521 stores a threshold TH1*a* for starting the "sparing processing" in which the data is copied from the storage apparatus where the error occurred to a spare storage apparatus. The other threshold field C522 stores a threshold TH2*a* for starting the correction copy processing.

The timeout failure field C53 is for managing timeout errors occurring in the storage apparatus 210, and comprises an error count field C530, a threshold field C531 for starting the sparing processing, and a threshold field C532 for starting the correction copy.

That is, the number of times of the occurrence of ordinary failures (error count value) and the number of times of the occurrence of timeout errors are managed separately. Furthermore, the thresholds for performing the sparing processing and the correction copy processing as the restoration steps are also set separately for ordinary failures and timeout errors respectively. Furthermore, in this embodiment, the thresholds TH1*b* and TH2*b* related to timeout errors are set larger than the thresholds TH1*a* and TH2*a* related to ordinary failures (e.g. TH1*b*=TH1*a*×2, TH2*b*=TH2*a*×2).

Therefore, in this embodiment, even if timeout errors occur frequently as a result of setting the timeout time short for reading data from the storage apparatuses 210, the possibility of performing the restoration steps such as the sparing processing or the correction copy processing can be reduced. In this embodiment, by inhibiting the start of the restoration steps, the increase of the load on the storage control apparatus 10 is prevented.

FIG. 15 shows the method for selecting the timeout time which is set for reading data from the storage apparatuses 210. As described above, in this embodiment, multiple timeout time [values] TOV 1 and TOV 2 are prepared. The first timeout time TOV 1 is set to a relatively long time, for example, a few seconds, and is also referred to as a normal value. The second timeout time TOV 2 is set to a relatively short time, for example, one second or shorter, and is also referred to as a shortened value. If the specified conditions described below are satisfied, the DKA 120 can set the timeout time to a short value TOV 2.

(Specified Condition 1)

The cases where "1" is set in the response time guarantee mode field C28 of the VDEV management table T20 shown in FIG. 7. That is, in cases where the mode to respond within a specified time is selected, the shortened value is selected as the timeout time.

(Specified Condition 2)

The cases where "1" is set for the response time guarantee mode of the mode setting table T30 shown in FIG. 8. [This condition is] the same as the Specified Condition 1. However, while the response time guarantee mode can be set in units of VDEVs under the Specified Condition 1, the response time guarantee mode can be set for the entire storage control apparatus 10 under the Specified Condition 2.

(Specified Condition 3)

The cases where the storage apparatus 210 as the read target is not a low-speed storage apparatus such as an SATA. If the storage apparatus as the read target is low-speed (if the response performance is low) and if the timeout time is set short, a timeout error might occur even if no failure occurs.

(Specified Condition 4)

The cases where the queuing mode is set to "1" either in the queuing mode field C27 of the VDEV management table T20 or in the mode setting table (queuing mode=FIFO mode). In the FIFO mode, as queues are processed in order of issuance, it does not occur that the processing of a queue with a distant logical address is postponed and is made to wait for an extremely long time. Meanwhile, in the sorting mode, as a queue at an isolated position might be made to wait for a long time, if the timeout time is shortened, the possibility that a timeout error might occur even if no failure occurs becomes higher.

(Specified Condition 5)

The cases where the load status of the storage apparatus 210 as the read target is equal to or smaller than the specified value. If the load on the storage apparatus 210 is equal to or larger than the specified value, data read takes time and a timeout error might occur even if no failure occurs. Therefore, unless the storage apparatus 210 are in the high-load status, the timeout time is set short.

In this embodiment which is configured as above, the DKA 120, if the specified conditions are satisfied, sets a short timeout time TOV 2 for a read request transmitted to the storage apparatuses 210 and, if a timeout error occurs, resets the read request and performs the correction read processing.

Therefore, even if the response performance of the storage apparatus 210 as the read target is deteriorated, if the timeout time elapses, the correction read processing can be performed. Therefore, the deterioration of the response performance of the storage control apparatus 10 can be prevented.

In this embodiment, for example, if the response time guarantee mode is set, if the queuing mode is FIFO, if [the storage apparatus is] not a low-speed storage apparatus, or if the storage apparatus is not highly loaded, the timeout time for reading data from the storage apparatus 210 is set to a shorter value than usual. Therefore, in this embodiment, in accordance with the circumstances, the deterioration of the response performance of the storage control apparatus 10 can be prevented.

In this embodiment, timeout errors are managed separately from ordinary failures in the storage apparatus. Therefore, even if the timeout time is set shorter than usual, the restoration step such as the sparing processing or the correction copy processing can be inhibited from being performed. Therefore, the deterioration of the response performance due to the increase of the load on the storage control apparatus 10 by performing the restoration steps can be prevented.

Embodiment 2

The Embodiment 2 is described with reference to FIG. 16. The respective embodiments described below including this embodiment are equivalent to a variation of the Embodiment 1. Therefore, the differences from the Embodiment 1 are mainly described. In this embodiment, in accordance with the queuing mode and the load status of the storage apparatus 210, the timeout time is set short. This embodiment is a variation of the (Specified Condition 5) described in the Embodiment 1.

FIG. 16 is a table T70 storing thresholds for setting the timeout time. The threshold table T70, for example, manages an HDD number field C71, a queuing command amount field C72, a threshold field C73 for the FIFO mode, and a threshold field for the sorting mode C74 by making the same correspond to each other.

In the HDD number field C71, the information for identifying the respective storage apparatuses 210 is stored. In the queuing command amount field C72, the number of unprocessed commands whose target is the storage apparatus 210 is stored. In the threshold field for the FIFO mode C73, the threshold TH3 for the cases where the queuing mode is set to the FIFO mode is stored. In the threshold field for the sorting mode C74, the threshold TH4 for the cases where the queuing mode is set to the sorting mode is stored.

If the number of unprocessed commands whose target is a storage apparatus 210 reaches either the threshold TH3 or the TH4 specified by the queuing mode, the timeout time of the read request whose read target is the storage apparatus 210 is set to a normal value.

The threshold TH3 for the FIFO mode is set larger than the threshold TH4 for the sorting mode (e.g. TH3=TH4×4). If the queuing mode is set to the FIFO mode, as there is no command whose processing is extremely postponed, the threshold TH3 is set larger than the TH4 for the sorting mode. If the queuing mode is the sorting mode, as the processing might be postponed depending on the logical address as the target of the command, the threshold TH4 is set smaller than the TH3 for the FIFO mode.

If a large number of unprocessed commands are cumulated in the storage apparatus 210, a timeout error might occur regardless of failures. The possibility that a timeout error might occur also varies depending on the method for processing the unprocessed commands.

Therefore, in this embodiment, the timeout time is set in accordance with the number of unprocessed commands and the queuing mode. By this method, the possibility that a timeout error unrelated to failures might occur can be inhibited. This embodiment also has the same effect as the Embodiment 1.

Embodiment 3

Figure 17:
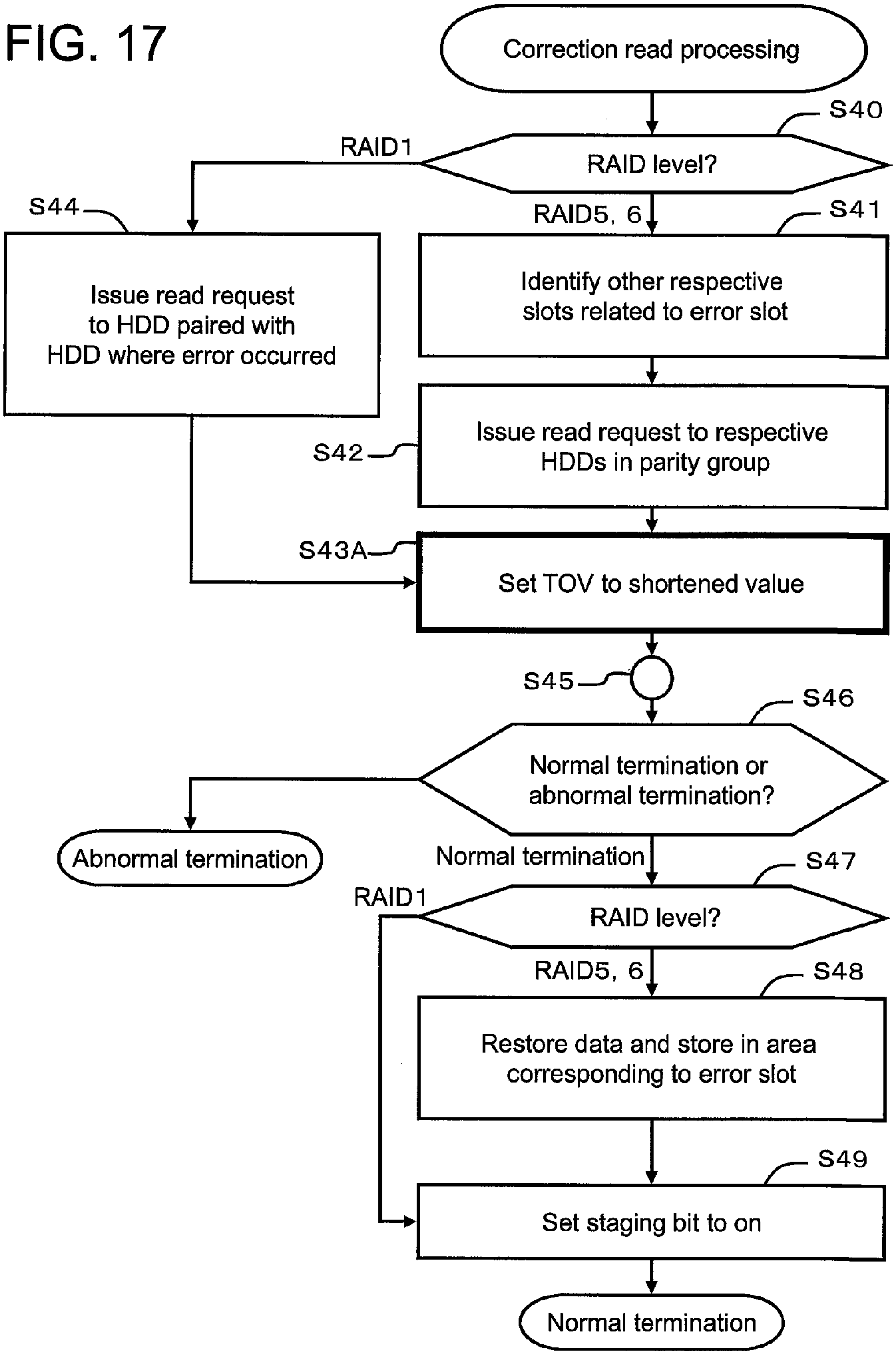
FIG. 17 is a flowchart showing the correction read processing with regard to the Embodiment 3.

The Embodiment 3 is described with reference to FIG. 17. In this embodiment, the timeout time in the correction read is set to a short value. FIG. 17 is a flowchart of the correction read processing. This processing comprises the steps S40 to S42, S44 to S49 which are common to the processing shown in FIG. 12. This processing is different from FIG. 12 at the point of S43A. That is, in the correction read processing of this embodiment, the timeout time is set to a shorter value than usual, and the data and the parity are read from the respective storage apparatuses 210.

This embodiment which is configured as above also has the same effect as the Embodiment 1. Furthermore, in this embodiment, the timeout time for the correction read is set short, which can further prevent the deterioration of the response performance in the storage control apparatus 10.

Embodiment 4

The Embodiment 4 is described with reference to FIG. 18 to FIG. 21. In this embodiment, if the correction read processing fails, the data read from the storage apparatus 210 as the first read target is retried.

FIG. 18 is a status management table T80 for managing the progress of the staging processing. The status management table T80, for example, comprises an item number field C81, a contents field C82, and a value field C83. In the item number field C81, each step in the staging processing for reading data from the storage apparatus 210 and transferring the same to the cache memory 130 is shown. When the staging processing reaches each step, "1" is set in the [corresponding] value field C83. An example of the respective steps in the staging processing is described below.

(Step 1)

At the Step 1, the timeout time is set to the shortened value TOV 2, and data read is required to the storage apparatus 210.

(Step 2)

At the Step 2, a timeout error related to the first read request occurs.

(Step 3)

At the Step 3, the correction read processing is attempted but fails.

(Step 4)

At the Step 4, the timeout time is set to the normal value TOV 1, and the second data read is required to the storage apparatus 210 as the read target.

Figure 19:
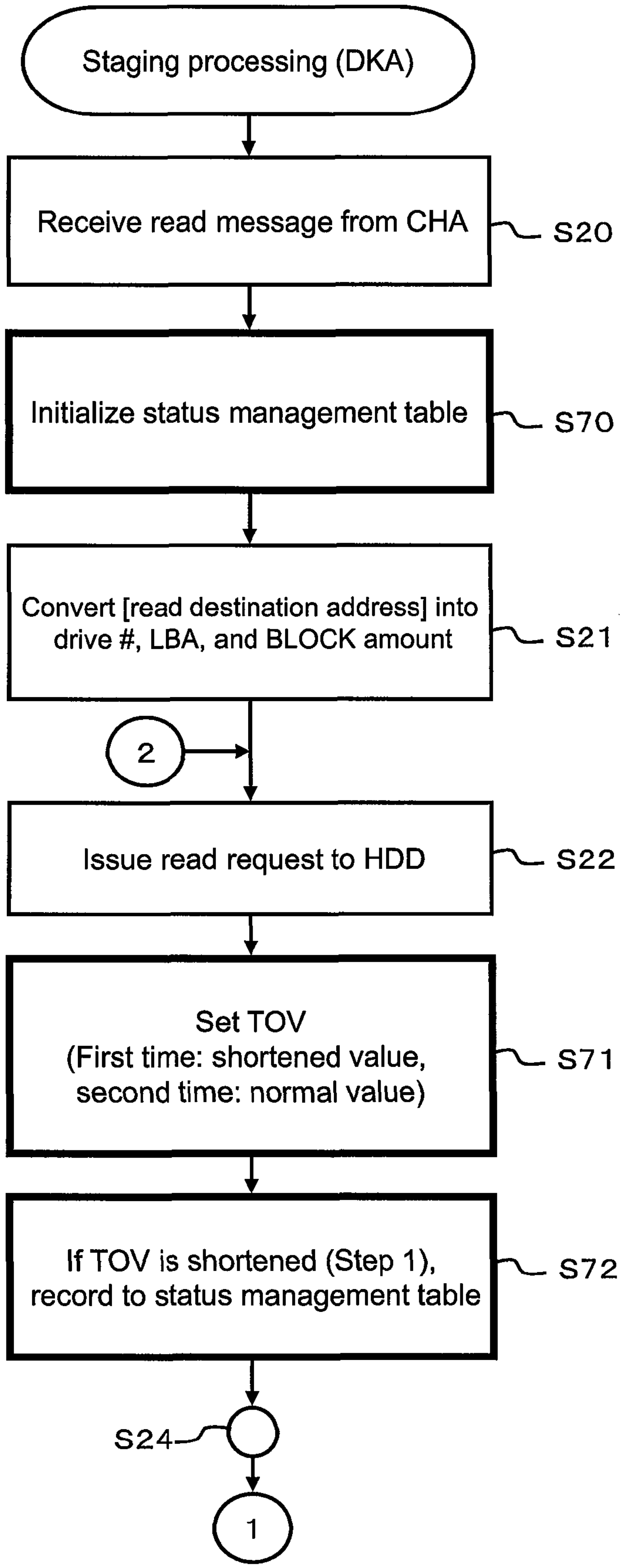
FIG. 19 is a flowchart showing the staging processing.
Figure 20:
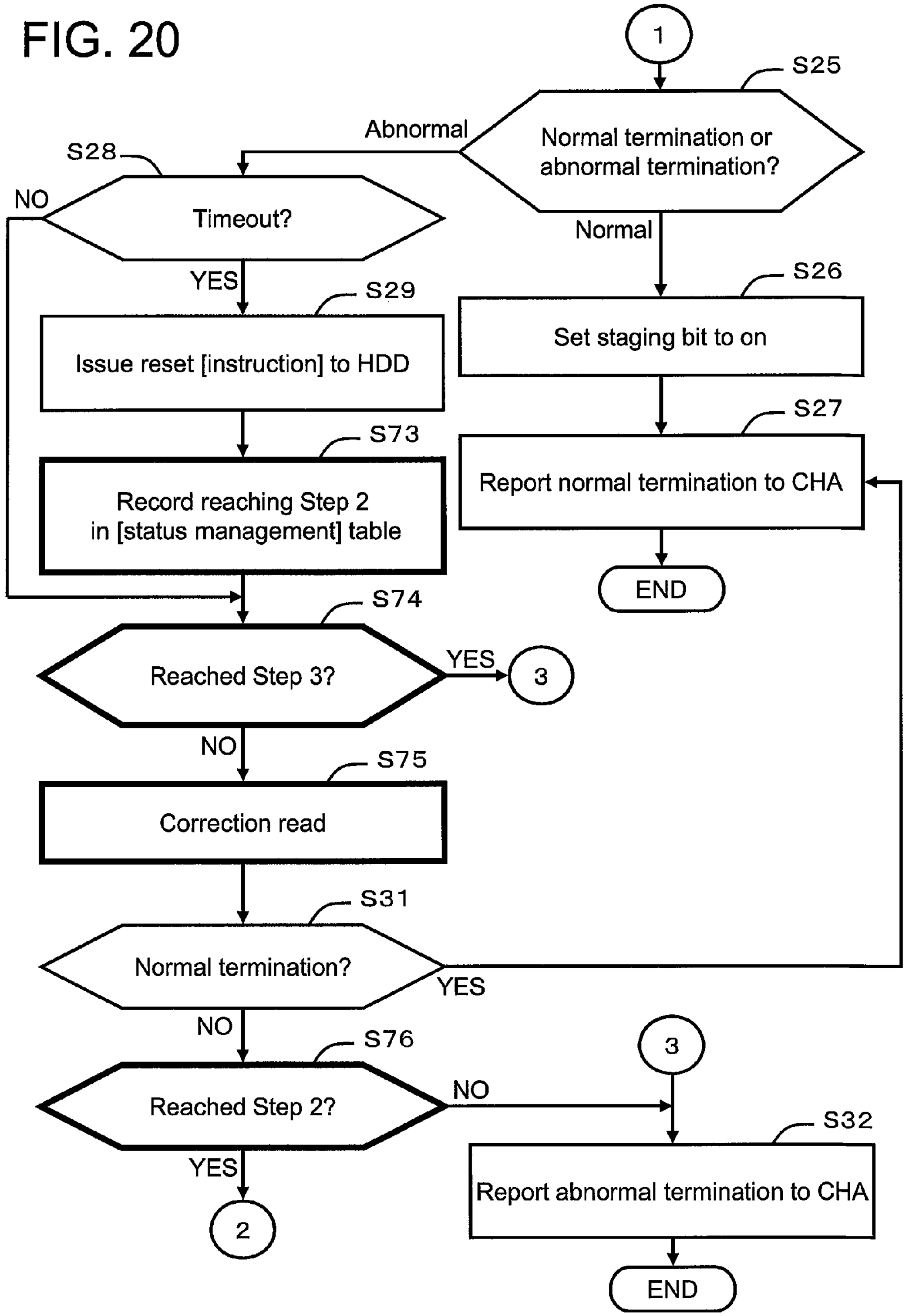
FIG. 20 is a flowchart continued from FIG. 19.

FIG. 19 and FIG. 20 are the flowcharts of the staging processing. This processing corresponds to the staging processing shown in FIG. 11. The differences between this processing and the processing shown in FIG. 11 are S70 to S76.

As shown in FIG. 19, the DKA 120, receiving a read message from the CHA 110 (S20), initializes the value field C83 of the status management table T80 (S83). The DKA 120, after performing the address conversion and others (S21), issues a read request to the storage apparatus 210 (S22).

The DKA 120 sets the timeout time of the read request to the TOV 2 which is a shorter value than usual (S71). Note that, if data read from the same storage apparatus 210 is retried, the timeout time is set to the normal value TOV 1 (S71).

The DKA 120, if setting the timeout time to the shortened value TOV 2, sets the value of the Step 1 in the status management table to "1" (S72). By this method, it is recorded to the table T80 that the first read is started.

[The processing] proceeds to FIG. 20. If the first data read from the storage apparatus 210 fails with a timeout (S28: YES), the DKA 120 issues a reset command and cancels the read request (S29). The DKA 120 sets the value of the Step 2 in the status management table T80 to "1" (S73). By this method, the occurrence of a timeout error related to the first read request is recorded to the status management table T80.

The DKA 120 refers to the status management table T80, and determines whether the staging processing reaches the Step 3 or not (S74). At this point, as the correction read processing is not started yet, [the processing] is determined not to reach the Step 3 (S74: NO). Therefore, the DKA 120 performs the correction read processing (S75).

If the correction read processing is normally terminated (S31: YES), the DKA 120 notifies to the CHA 110 that the read request is normally terminated (S27). If the correction read processing is not terminated normally (S31: NO), the DKA 120 refers to the status management table T80 and determines whether the progress of the staging processing reaches the Step 2 or not (S76).

At this point, at S72 in FIG. 19 and at S73 in FIG. 20, the Step 1 and the Step 2 of the status management table T80 are set to "1" respectively. Therefore, the DKA 120 determines that [the processing] reaches the Step 2 (S76: YES), and returns to S22 in FIG. 19. The DKA 120 issues a read request to the storage apparatus 210 as the read target again (S22). In that case, the DKA 120 sets the timeout value related to the second read request to the normal value TOV 1 (S71). As this is the second read request and the timeout value is not shortened, S72 is skipped.

By the second read request, if the data is normally read from the storage apparatus 210 within the timeout time, the DKA 120 sets the staging bit to on (S26), and reports the normal termination to the CHA 110 (S27).

If the second read request also fails and a timeout error occurs (S28: YES), the DKA 120 resets the second read request (S29). Note that, as the Step 2 in the status management table T80 is set to "1," "1" is not set at S73 again, and [the processing] shifts to S73.

The DKA 120 refers to the status management table T80, and determines whether the [processing] reaches the Step 3 or not (S74). At this point, as the attempt of the correction read processing failed (S74: YES), the DKA 120 notifies the CHA 110 that the processing of the read request failed (S32). That is, if the second read request fails, this processing is terminated without performing the second correction read processing.

Figure 21:
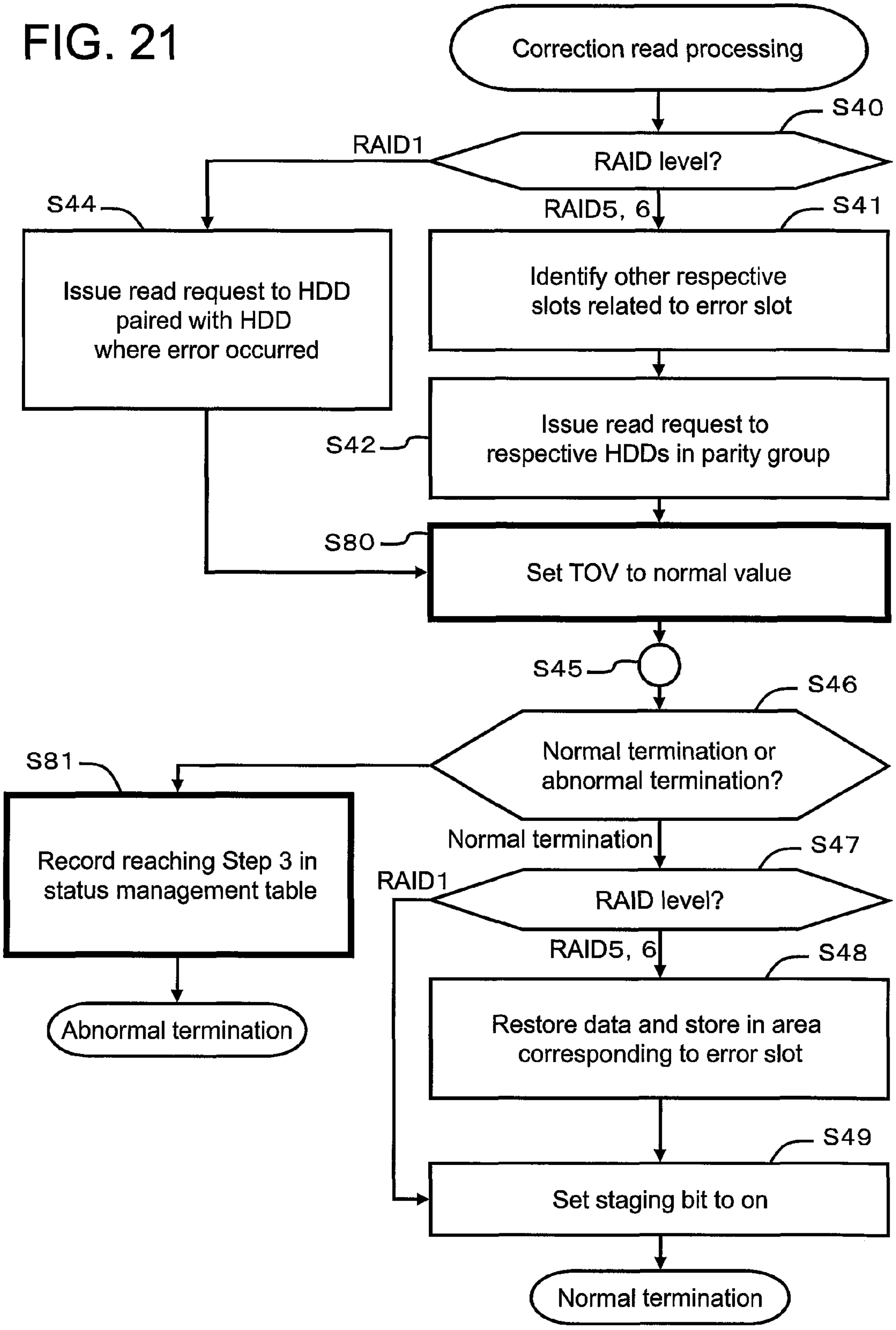
FIG. 21 is a flowchart of the correction read processing

FIG. 21 is a flowchart of the correction read processing. This processing is different from the processing shown in FIG. 12 in S80 and S81. The DKA 120 sets the normal value as the timeout time for the correction read (S80). If the correction read processing is terminated abnormally, the DKA 120 sets the Step 3 of the status management table T80 to "1" and records that the correction read failed (S81).

This embodiment which is configured as above also has the same effect as the Embodiment 1. Furthermore, in this embodiment, if the correction read fails, data read from the storage apparatus 210 is retried with the normal timeout time. Therefore, the possibility of being able to read data from the storage apparatus 210 can be increased, and the reliability in the storage control apparatus 10 can be improved.

Embodiment 5

The Embodiment 5 is described with reference to FIG. 22 and FIG. 23. In this embodiment, in accordance with the status of the respective storage apparatuses 210 as the target of the correction read, the performance of the correction read processing is controlled.

Figure 22:
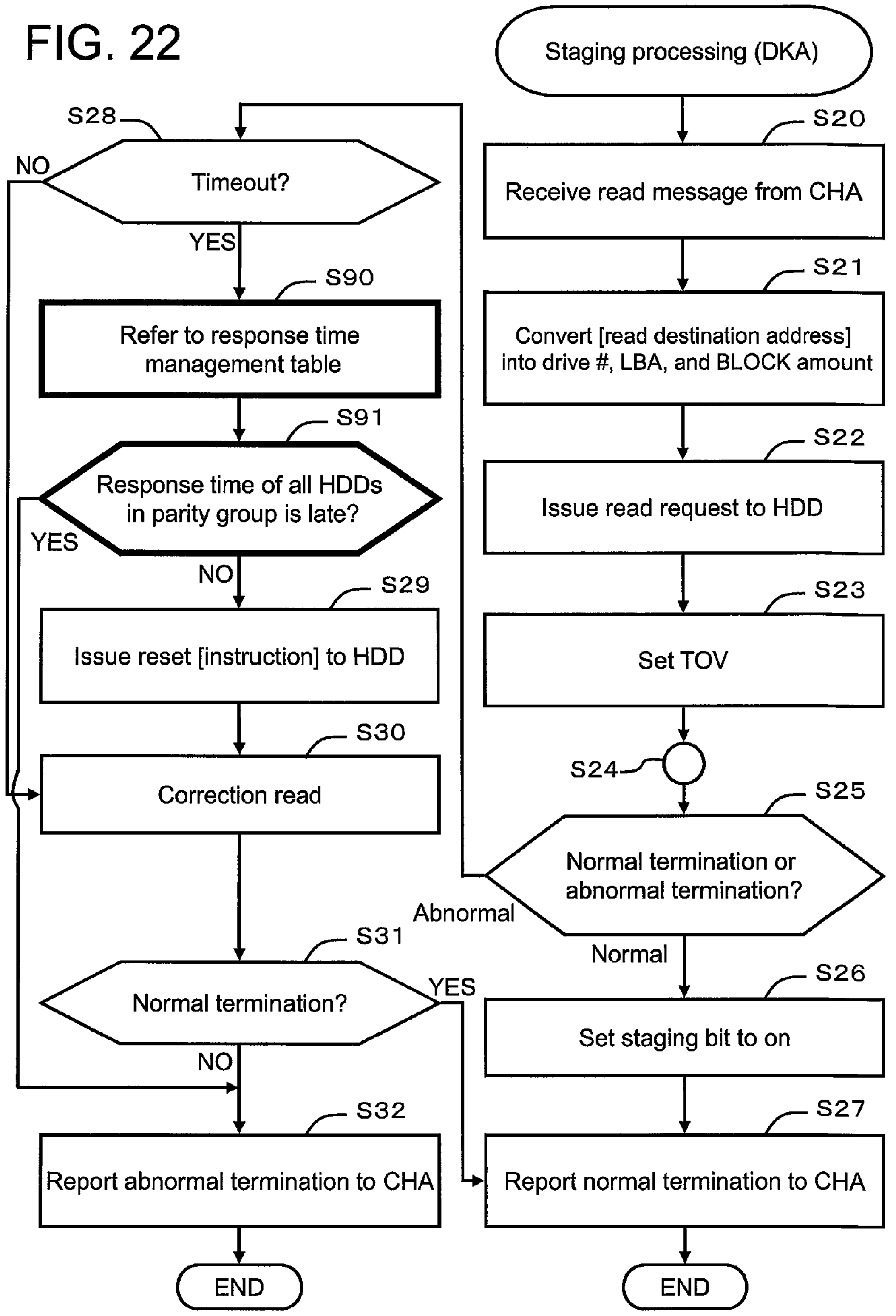
FIG. 22 is a flowchart showing the staging processing with regard to the Embodiment 5.

FIG. 22 is a flowchart of the staging processing. The processing in FIG. 22 is different from the processing shown in FIG. 11 in S90 and S91. If a timeout error occurs (S28: YES), the DKA 120 refers to the response time management table T90 (S90), and determines whether the response time [values] of all the storage apparatuses 210 as the target of the correction read are longer than the standard value or not (S91).

If the response time [values] of the respective storage apparatuses 210 as the correction read target are longer [than the standard value] (S91: YES), the DKA 120 does not perform the correction read processing and notifies the CHA 110 that the processing of the read request failed (S32).

If the response time [values] of the respective storage apparatuses 210 as the correction read target are not longer than the standard value (S91: NO), the DKA 120 resets the read request (S29), and performs the correction read processing (S30).

Note that, not limited to the cases where the response time [values] of all the storage apparatuses 210 as the correction read target are late, if the response time [values] of the specified number of storage apparatuses 210 or more among all the storage apparatuses 210 as the correction read target are larger than the standard value, or if the response time [values] of one or more storage apparatuses 210 of all the storage apparatuses 210 as the correction read target are larger than the standard value, the configuration in which the correction read processing is not performed may also be permitted.

FIG. 23 shows the table T90 managing the response time of the respective storage apparatuses 210. The response time management table T90, for example, manages a VDEV number field C91, an HDD number field C92, a response time field C93, and a determination field C94 by making the same correspond to each other.

In the response time field C93, the latest response time of each storage apparatus 210 is recorded. In the determination field C94, the result of comparing the response time of each storage apparatus 210 with the specified standard value is recorded. If the response time is equal to or larger than the standard value, "Late" is recorded while, if the response time is under the standard value, "Normal" is recorded.

By using the response time management table T90, it can be determined whether the correction read can be completed in a short time or not. Note that, instead of managing the response time directly, the number of unprocessed commands of each storage apparatus may also be managed. Furthermore, the configuration in which, in accordance with the number of unprocessed commands, the type of the storage apparatus 210, and other information, the time required for the correction read processing is presumed may also be permitted.

Embodiment 6

The Embodiment 6 is described with reference to FIG. 24 to FIG. 26. In this embodiment, if the correction read processing fails, [the failure] is notified to the user, and [the processing is] switched to the storage control apparatus 10 (2) of the standby system.

Figure 24:
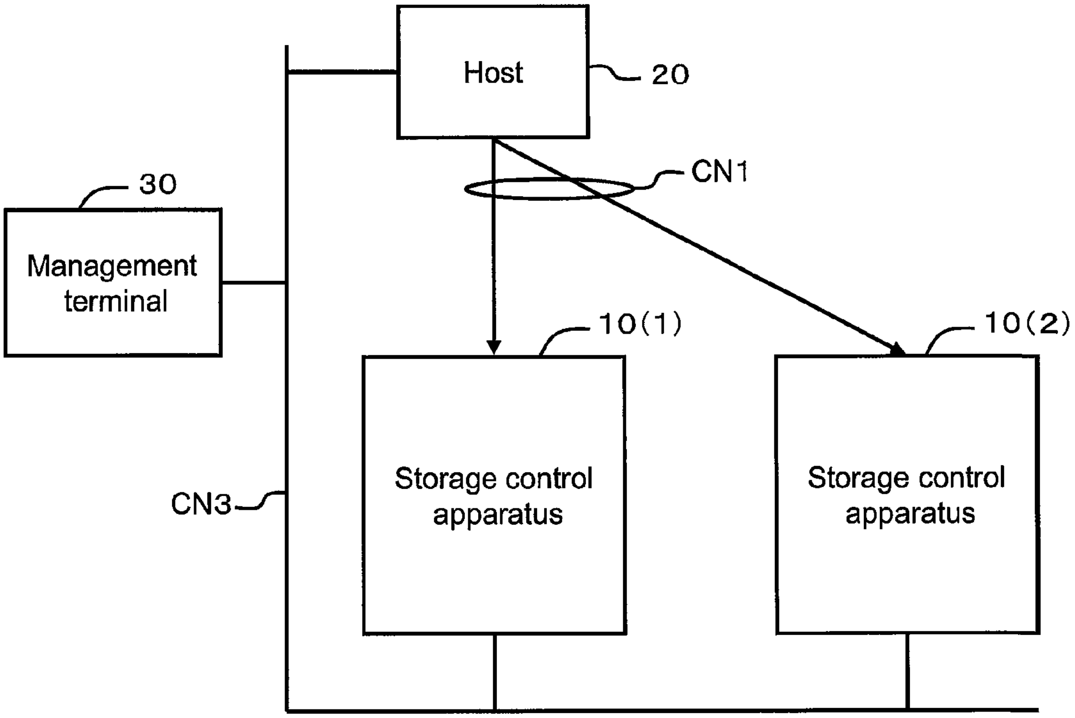
FIG. 24 is a diagram of the overall configuration of a system with regard to the Embodiment 6.

FIG. 24 is a system configuration diagram of this embodiment. This embodiment comprises the storage control apparatus 10 (1) of the currently used system and the storage control apparatus 10 (2) of the standby system. In normal cases, the user uses the storage control apparatus 10 (1) of the currently used system.

Figure 25:
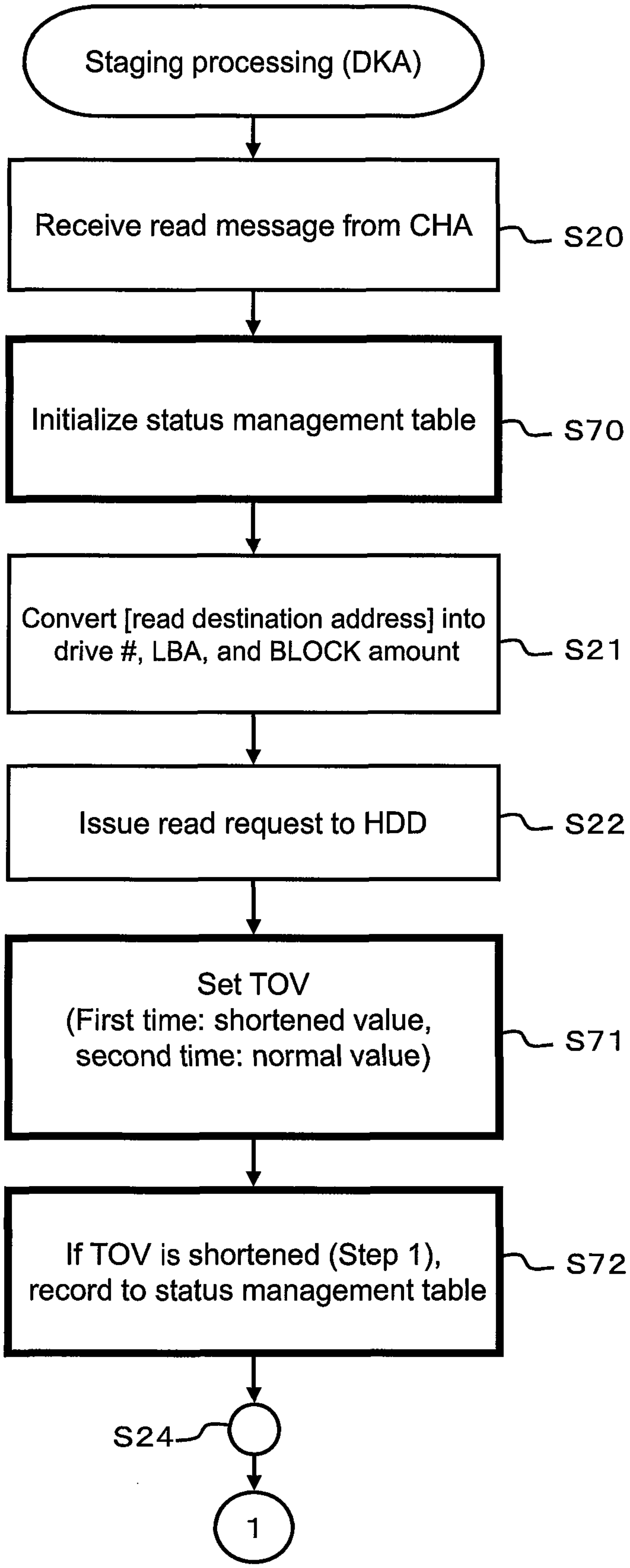
FIG. 25 is a flowchart of the staging processing.
Figure 26:
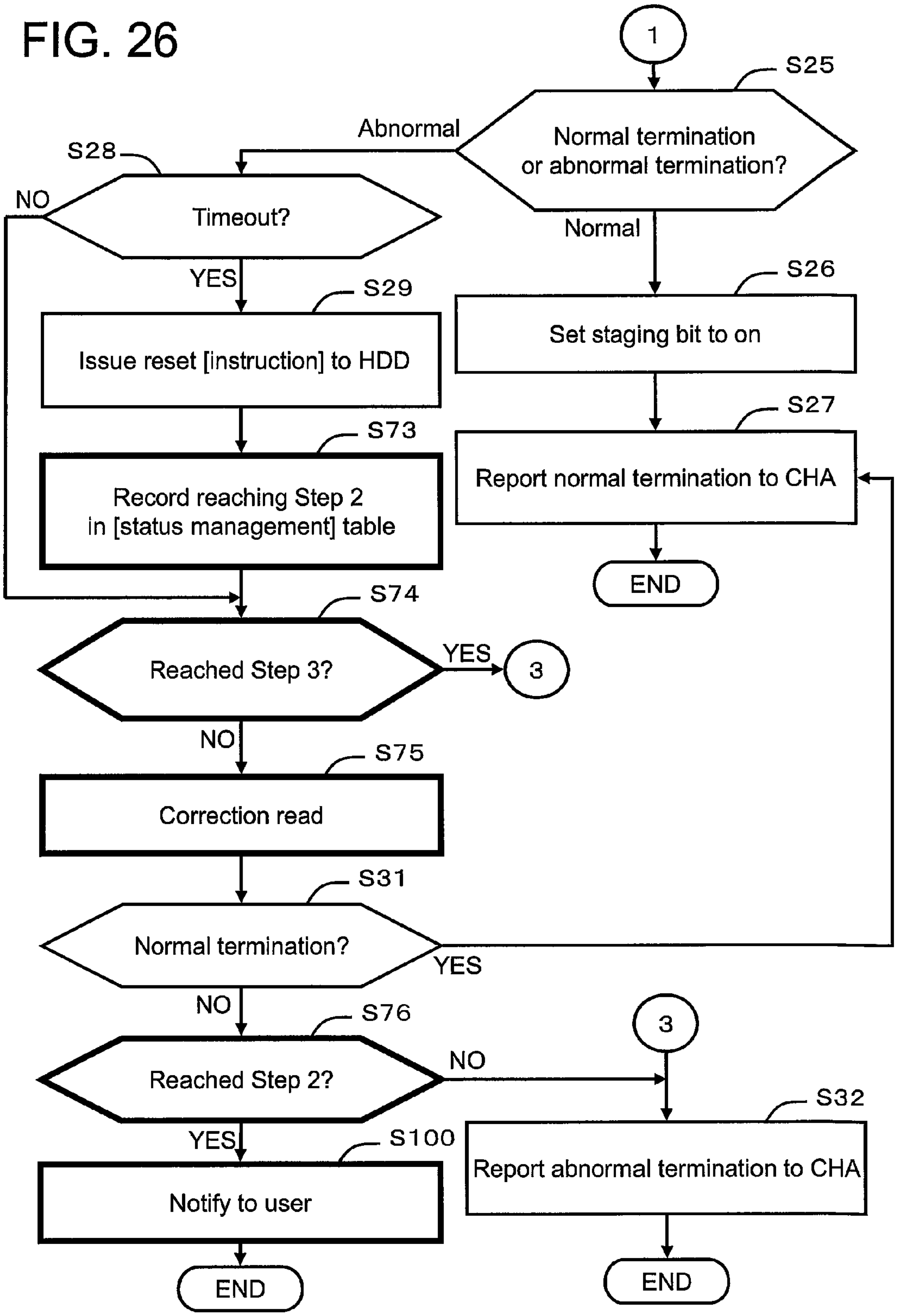
FIG. 26 is a flowchart continued from FIG. 25.

FIG. 25 and FIG. 26 are the flowcharts of the staging processing. The flowchart in FIG. 25 is different from the flowchart in FIG. 19 in that the connector 2 is not included. The flowchart in FIG. 26 is different from the flowchart in FIG. 20 in the processing after the correction read processing fails.

In this embodiment, if the correction read processing fails (S31: NO, S76: YES), [the failure] is notified to the user, and this processing is terminated (S100). The notification is transmitted to the user via the management terminal 30. The user can select whether to issue a read request from the host 20 to the storage control apparatus 10 (1) of the currently used system again or to switch [the processing] from the storage control apparatus 10 (1) of the currently used system to the storage control apparatus 10 (2) of the standby system. This embodiment which is configured as above also has the same effect as the Embodiment 1.

Note that this invention is not limited to the above-mentioned embodiments. A person with an ordinary skill in the art, for example, such as combining the above-mentioned respective embodiments appropriately, may be able to perform various types of addition, alteration, and others within the scope of this invention.

REFERENCE SIGN LIST

1: storage control apparatus, 2: host, 3: controller, 4: storage apparatus, 5: channel adapter (CHA), 6: memory, 7: disk adapter (DKA), 10: storage control apparatus, 20: host, 30: management terminal, 100: controller, 110: CHA, 120: DKA, 130: cache memory, 140: shared memory, 210: storage apparatus, 220: parity group (VDEV), 230: logical volume (LDEV).

The invention claimed is:

1. A storage control apparatus comprising:

a plurality of storage devices which are controlled as a Redundant Array of Independent Disks (RAID) group for storing data; and a controller which is connected to a higher-level device and each of the storage devices and which reads data from a specified storage device of the plurality of storage devices that is specified by a read request from the higher-level device, in accordance with the read request, wherein the controller sets a first timeout period of the specified storage device, to one of a first value and a second value, shorter than the first value, the second value being set for guaranteeing a response time from the storage control apparatus to the higher-level device, wherein the second value is selected if a certain condition of the plurality of storage devices is satisfied, wherein the controller generates the data based on other data which is acquired from one or more other storage devices in the RAID group related to the specified storage device when the data is not read from the specified storage device within the first timeout period, and wherein, upon receiving the read request from the higher-level device when the first timeout period is set to the second value, the controller:

reads the data corresponding to the read request from the specified storage device, detects that a timeout error occurred when the data is not acquired from the specified storage device within the first timeout period, sets a second timeout period of the one or more other storage devices in the RAID group related to the specified storage device to the first value, and reads the other data corresponding to the data from the one or more other storage devices in the RAID group related to the specified storage device, generates the data based on the other data which is acquired from the one or more other storage devices in the RAID group related to the specified storage device, and transfers the generated data to the higher-level device.

2. The storage control apparatus according to claim 1, wherein:

the controller includes a first communication control unit for communicating with the higher-level device, a second communication control unit for communicating with the plurality of storage devices, and a memory used by the first communication control unit and the second communication control unit, the memory stores timeout time setting information for determining whether to set the first timeout period to the first value or to the second value, the timeout time setting information includes a number of queues whose targets are the plurality of storage devices, a threshold for First In First Out (FIFO) in cases where a FIFO mode is set as a queuing mode, and a threshold for sorting which is smaller than the threshold for FIFO in cases where the queuing mode is set to a sorting mode in which sorting is performed in ascending order of distance of logical addresses, the second communication control unit, in accordance with the timeout time setting information, if the number of queues whose target is the specified storage device is equal to or larger than either the threshold for FIFO or the threshold for sorting corresponding to the queuing mode set for the specified storage device, selects the first value for the first timeout period for reading the data from the specified storage device, and if the number of queues whose target is the specified storage device is under either the threshold for FIFO or the threshold for sorting corresponding to the queuing mode set for the specified storage device, selects the second value for the first timeout period, which is smaller than the first value, for reading the data from the specified storage device, the second communication control unit requires the read of the data from the specified storage device in response to the read request, the second communication control unit, if unable to acquire the data from the specified storage device within the first timeout period, detects the timeout error has occurred, and instructs a second management unit, which is different from a first management unit for managing failures which occur in the plurality of storage devices, to manage the occurrence of the timeout error, a value of a threshold for restoration for starting a specified restoration step related to the specified storage device in which a failure occurred is set larger for the second communication control unit than the first communication control unit, the second communication control unit selects the first value for the second timeout period for the one or more other storage devices in the RAID group related to the specified storage device, requires the read of the other data corresponding to the data to the one or more other storage devices in the RAID group related to the specified storage device, generates the data in accordance with the other data acquired from the other storage devices, and transfers the generated data to the higher-level device, and the second communication control unit, if unable to acquire the other data from the one or more other storage devices within the second timeout period, sets a third timeout period for the specified storage device to the first value, and requires the read of the data from the specified storage device again.

3. The storage control apparatus according to claim 1, further comprising:

a first management unit which manages a number of failures which occur in the plurality of storage devices and a threshold for restoration for starting a specified restoration step related to the storage devices in which the failures occur by storing the number of failures and the threshold in correspondence with each other; and a second management unit which manages a number of timeout errors which occur in the plurality of storage devices and another threshold for restoration for starting the specified restoration step related to the storage devices in which the timeout errors occurred by making the same correspond to each other, and the another threshold for restoration managed by the second management unit is set to a value larger than the threshold for restoration managed by the first management unit.

4. The storage control apparatus according to claim 1, wherein the controller, if a guarantee mode for guaranteeing the response time within the first timeout period is set for the specified storage device, sets the first timeout period for reading the data from the specified storage device to the second value.

5. The storage control apparatus according to claim 1, wherein the controller, if a queuing mode related to the specified storage device is set to a First In First Out (FIFO) mode, sets the first timeout period for reading the data from the specified storage device to the second value.

6. The storage control apparatus according to claim 1, wherein the controller, if the specified storage device is not a low-speed storage device, sets the first timeout period for reading the data from the specified storage device to the second value.

7. The storage control apparatus according to claim 1, wherein the controller, if a number of queues whose target is the specified storage device is smaller than a queuing threshold, sets the first timeout period for reading the data from the specified storage device to the second value.

8. The storage control apparatus according to claim 1, wherein:

the controller comprises timeout period setting information for determining whether to set the first timeout period to the first value or to the second value, which includes a number of queues whose targets are the plurality of storage devices, a threshold for First In First Out (FIFO) in cases where a FIFO mode is set as a queuing mode, and a threshold for sorting which is smaller than the threshold for FIFO in cases where the queuing mode is set to a sorting mode in which sorting is performed in ascending order of distance of logical addresses, and the controller, if the number of queues whose target is the specified storage device is equal to or larger than either the threshold for FIFO or the threshold for sorting corresponding to the queuing mode set for the specified storage device, selects the first value for the first timeout period for reading the data from the specified storage device and, if the number of queues whose target is the specified storage device is under either the threshold for FIFO or the threshold for sorting corresponding to the queuing mode set for the specified storage device, selects the second value, which is smaller than the first value, for the first timeout period for reading the data from the specified storage device.

9. The storage control apparatus according to claim 1, wherein the controller, if unable to acquire the other data from the one or more other storage devices in the RAID group related to the specified storage device within the first value, sets a third timeout period of the specified storage device to the first value and requires the read of the data from the specified storage device again.

10. The storage control apparatus according to claim 1, wherein the controller, if unable to acquire the other data from the one or more other storage devices in the RAID group related to the specified storage device within the third timeout period, notifies a user.

11. A control method of a storage control apparatus which is connected to a higher-level device and a plurality of storage devices which are controlled as a Redundant Array of Independent Disks (RAID) group for storing data, comprising the steps of:

setting a first timeout period of a specified storage device of the plurality of storage devices to a second value, lower than a first value, if a certain condition of the plurality of storage devices is satisfied, for guaranteeing a response time from the storage control apparatus to the higher-level device;

when the second value is set, the method comprises the steps of:

receiving a read request from the higher-level device for data from the specified storage device of the plurality of storage devices;

reading the data corresponding to the read request from the specified storage device;

detecting that a timeout error occurred when the data cannot be acquired from the specified storage device within the first timeout period;

setting a second timeout period of the one or more other storage devices in the RAID group related to the specified storage device to the first value;

reading other data corresponding to the data from the one or more other storage devices in the RAID group related to the specified storage device;

generating the data based on the other data which is acquired from the one or more other storage devices in the RAID group related to the specified storage device; and transferring the generated data to the higher-level device.

* * * * *